United States Patent
Fujii et al.

(10) Patent No.: US 11,764,861 B2
(45) Date of Patent: *Sep. 19, 2023

(54) INTERFERENCE CANCELING IN HAPS MULTI-FEEDER LINK

(71) Applicant: HAPSMobile Inc., Tokyo (JP)

(72) Inventors: Takafumi Fujii, Tokyo (JP); Teruya Fujii, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 17/434,842

(22) PCT Filed: Feb. 12, 2020

(86) PCT No.: PCT/JP2020/005323
§ 371 (c)(1),
(2) Date: Aug. 30, 2021

(87) PCT Pub. No.: WO2020/179384
PCT Pub. Date: Sep. 10, 2020

(65) Prior Publication Data
US 2022/0149929 A1    May 12, 2022

(30) Foreign Application Priority Data
Mar. 1, 2019 (JP) ................. 2019-038046

(51) Int. Cl.
*H04B 7/06* (2006.01)
*H04B 7/185* (2006.01)
*H04W 16/28* (2009.01)

(52) U.S. Cl.
CPC ........ *H04B 7/18506* (2013.01); *H04W 16/28* (2013.01)

(58) Field of Classification Search
CPC .............. H04B 7/18506; H04B 7/0617; H04B 7/18513; H04B 7/18504; H04W 16/28
See application file for complete search history.

(56) References Cited

U.S. PATENT DOCUMENTS

| 6,675,013 B1 * | 1/2004 | Gross ................. H04B 7/18504 455/12.1 |
| 7,027,769 B1 | 4/2006 | Rosen et al. |

(Continued)

FOREIGN PATENT DOCUMENTS

| JP | 2001-308770 A | 11/2001 |
| JP | 2009-505499 A | 2/2009 |

(Continued)

OTHER PUBLICATIONS

Takafumi et al. "A Study on Efficient Spectrum Utilization for Feeder Link Using Multiple Gateways in Haps System, pp. 1-29, (2018)" (Year: 2018).*

(Continued)

*Primary Examiner* — Kenneth T Lam
(74) *Attorney, Agent, or Firm* — Muirhead and Saturnelli, LLC

(57) ABSTRACT

Interferences in multi-feeder links on a same frequency between an aerial-floating type communication relay apparatus and plural gateway (GW) stations are dynamically suppressed. Each of the plural GW stations transmits plural pilot signals with frequencies different from each other in the feeder link. A relay communication station of a communication relay apparatus: estimates a propagation path response by calculating plural path differences between the plural GW stations and an antenna for feeder link of a communication relay apparatus, based on reception results of the plural pilot signals received from each of the plural GW stations; calculates a weight for suppressing an interference signal that causes an interference by a transmission (Continued)

signal transmitted from the GW stations and received by a directional beam corresponding to other GW stations, based on the plural propagation path responses; and subtracts reception signals received respectively by the directional beams corresponding to the other GW stations and multiplied respectively by the weight corresponding to the other GW stations, from the reception signal received by the directional beam corresponding to each of the GW stations.

19 Claims, 21 Drawing Sheets

(56) References Cited

U.S. PATENT DOCUMENTS

| | | | |
|---|---|---|---|
| 7,831,202 B2 | 11/2010 | Karabinis | |
| 9,798,329 B2 | 10/2017 | Shattil | |
| 10,848,982 B2 | 11/2020 | Fujii | |
| 2006/0276129 A1* | 12/2006 | Karabinis | H04B 7/18513 455/13.3 |
| 2009/0010238 A1* | 1/2009 | Barak | H04L 5/0051 370/342 |
| 2016/0046387 A1 | 2/2016 | Frolov et al. | |
| 2017/0126309 A1 | 5/2017 | Rupasinghe et al. | |
| 2020/0322044 A1* | 10/2020 | Knopp | H04B 7/0413 |
| 2021/0250083 A1* | 8/2021 | Fujii | H04B 7/18504 |
| 2022/0190907 A1* | 6/2022 | Fujii | H04B 7/2041 |
| 2022/0376771 A1* | 11/2022 | Fujii | H04B 7/18513 |
| 2022/0407587 A1* | 12/2022 | Fujii | H04J 13/004 |

FOREIGN PATENT DOCUMENTS

| | | | | |
|---|---|---|---|---|
| WO | WO 2017/159086 A1 | 9/2017 | | |
| WO | WO 2018/075962 A1 | 4/2018 | | |
| WO | WO-2018075962 A1 * | 4/2018 | ............ | H04B 7/026 |
| WO | WO 2018/207612 A1 | 11/2018 | | |

OTHER PUBLICATIONS

Kazuki Maruta, et al., "Interference Suppression Schemes for Pilot Decontamination on Multicell Massive MIMO Systems," The Institute of Electronics Information and Communication Engineers, IEICE Technical Report, RSC2018-177, Oct. 2018.

Takafumi Fujii, et al., "Interference Cancelation for Reverse-Link in HAPS Multi-Gateway Feeder Link System," Sep. 10, 2019.

Takafumi Fujii, et al., A Study on Efficient Spectrum Utilization for Feeder Link using Multipe Gateways in HAPS System, HAPS Mobile Inc., The Institute of Electronics, Information and Communication Engineers, IEICE Technical Report, RCS2018-203, Nov. 2018.

Zhenhong Shao, et al., "Interference Assessment between High Altitude Platform System (HAPS) and Fixed Satellite Service (FSS) in C-Band," 2012 International Conference on Computer Science and Information Processing (CSIP), IEEE, Aug. 24, 2012, pp. 283-287.

Babar Mansoor, et al., "Superimposed Training Based Estimation of Sparse MIMO Channels for Emerging Wireless Networks," 2016 23rd International Conference on Telecommunications (ICT), IEEE, May 16, 2016, pp. 1-6.

Pantelis-Daniel Arapoglou, et al., "MIMO over Satellite: A Review," IEEE Communications Surveys & Tutorials, IEEE, May 27, 2010, pp. 27-51.

* cited by examiner

INTERFERENCE CANCELING IN HAPS MULTI-FEEDER LINK

TECHNICAL FIELD

The present invention relates to an interference canceling in a multi-feeder link of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

Since a communication capacity of the service link of the aerial-floating type communication relay apparatus (hereinafter referred to as "upper-air relay apparatus") depends on a communication capacity of the feeder link which is a relay frequency, it is indispensable to effectively use the frequency of feeder link. Therefore, a method for forming a multi-feeder link is conceivable, in which plural GW stations on the ground are disposed at locations separated from each other and each GW station transmits and receives feeder link signals different from each other on the same frequency. However, unlike the fixed station, the upper-air relay apparatus flies around in a predetermined airspace, so that a dynamic interference may occur in the multi-feeder link between the upper-air relay apparatus and the plural GW stations on the same frequency.

Solution to Problem

A system according to an aspect of the present invention is a system comprising an aerial-staying type communication relay apparatus including a relay communication station that relays a radio communication of a terminal apparatus. The system comprises plural gateway stations that are time-synchronized with each other, and transmit and receive relay signals different from each other on a same frequency in feeder links between the relay communication station of the aerial-staying type communication relay apparatus and the plural gateway stations. The relay communication station comprises a feeder-link communication section that transmits and receives relay signals different from each other on the same frequency in the feeder to and from the plural gateway stations, and an interference suppression section that suppresses interferences between plural feeder links formed between the plural gateway stations and the interference suppression section. Each of the plural gateway stations transmits plural pilot signals with frequencies from different each other. The feeder-link communication section receives the plural pilot signals with frequencies different from each other, which are respectively transmitted from the plural gateway stations. The interference suppression section estimates a propagation path response by calculating plural path differences between each of the plural gateway stations and an antenna for feeder link of the communication relay apparatus based on reception results of the plural pilot signals received respectively from the plural gateway stations, calculates, for each of the plural gateway stations, a weight for suppressing an interference signal that causes an interference by a transmission signal transmitted from the gateway station and received with directional beams corresponding to remaining other gateway stations, based on the plural propagation path responses, and subtracts, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations.

A relay communication station according to another aspect of the present invention is a relay communication station that is incorporated in an aerial-staying type communication relay apparatus to relay a radio communication of a terminal apparatus. The relay communication station comprises a feeder-link communication section that transmits and receives relay signals different from each other on a same frequency in feeder links between the feeder-link communication section and plural gateway stations that are time-synchronized with each other, and an interference suppression section that suppresses interferences between plural feeder links formed between the plural gateway stations and the interference suppression section. The feeder link communication section receives plural pilot signals with frequencies different from each other, which are transmitted respectively from the plural gateway stations. The interference suppression section estimates a propagation path response by calculating plural path differences between each of the plural gateway stations and an antenna for feeder link of the communication relay apparatus based on reception results of the plural pilot signals received respectively from the plural gateway stations, calculates, for each of the plural gateway stations, a weight for suppressing an interference signal that causes an interference by a transmission signal transmitted from the gateway station and received by a directional beam corresponding to remaining other gateway stations, based on the plural propagation path responses, and subtracts, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations.

An aerial-staying type communication relay apparatus according to another aspect of the present invention comprises the foregoing relay communication station.

A gateway station according to yet another aspect of the present invention is a gateway station which transmits and receives relay signals different from each other on a same frequency in a feeder link between the gateway station and a relay communication station that is incorporated in an aerial-staying type communication relay apparatus to relay a radio communication of a terminal apparatus. The gateway station is time-synchronized with another gateway station that transmits and receives relay signals on the same frequency in the feeder link between the relay communication station and the gateway station, and transmits plural pilot signals with frequencies different from each other in the feeder link.

An interference suppression method according to yet another aspect of the present invention is a feeder-link interference suppression method in a relay communication station that is incorporated in an aerial-staying type communication relay apparatus and relays a radio communication of a terminal apparatus. The interference suppression method includes receiving plural pilot signals of frequencies different from each other which are transmitted respectively from plural gateway stations that are time-synchronized with each other, estimating a propagation path response by calculating plural path differences between each of the plural gateway stations and an antenna for feeder link of the communication relay apparatus based on reception results of the plural pilot signals received respectively from the plural gateway stations, calculating, for each of the plural gateway stations, a weight for suppressing an interference signal that causes an interference by a transmission signal transmitted from the gateway station and received with directional beams corresponding to other gateway stations, based on the plural propagation path responses, and subtracting, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations.

A feeder-link communication method according to yet another aspect of the present invention is a feeder-link communication method in a gateway station for transmitting and receiving relay signals different from each other on a same frequency in a feeder link between the gateway station and a relay communication station that is incorporated in an aerial-staying type communication relay apparatus to relay a radio communication of a terminal apparatus. The feeder-link communication method comprises time-synchronizing with another gateway station that transmits and receives relay signals on the same frequency in the feeder link between the relay communication station and the gateway station, and transmitting plural pilot signals with frequencies different from each other in the feeder link.

A program according to yet another aspect of the present invention is a program executed by a computer or a processor installed in a relay communication station that is incorporated in an aerial-staying type communication relay apparatus and relays a radio communication of a terminal apparatus. The program comprises a program code for transmitting and receiving relay signals different from each other on a same frequency in a feeder link between the relay communication station and plural gateway stations that are time-synchronized with each other, a program code for receiving plural pilot signals with frequencies different from each other, which are transmitted respectively from the plural gateway stations, a program code for separating each of the received plural pilot signals with a filter, a program code for estimating a propagation path response by calculating plural path differences between each of the plural gateway stations and an antenna for feeder link of the communication relay apparatus based on reception results of the plural pilot signals received respectively from the plural gateway stations, a program code for calculating, for each of the plural gateway stations, a weight for suppressing an interference signal that causes an interference by a transmission signal transmitted from the gateway station and received with directional beams corresponding to other gateway stations, based on the plural propagation path responses, and a program code for subtracting, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations.

A program according to yet another aspect of the present invention is a program executed by a computer or a processor installed in a gateway station for transmitting and receiving relay signals different from each other on a same frequency in a feeder link between the gateway station and a relay communication station that is incorporated in an aerial-staying type communication relay apparatus to relay a radio communication of a terminal apparatus. The program comprises a program code for time-synchronizing with another gateway station that transmits and receives relay signals on the same frequency in the feeder link between the relay communication station and the gateway station, and a program code for transmitting plural pilot signals with frequencies different from each other in the feeder link.

In the foregoing system, the foregoing relay communication station, the foregoing aerial-staying type communication relay apparatus, the foregoing gateway station, the foregoing interference suppression method, the foregoing feeder-link communication method, and the foregoing program, the plural pilot signals may be distributed in plural guard bands located on both sides of the transmission signal band of the feeder link and transmitted.

The foregoing interference suppression section may calculate the plural weights by estimating the plural propagation path responses at a center frequency of a transmission signal band of the feeder link or a frequency around the center frequency.

Each of the foregoing plural weights may be calculated by the ZF (Zero-Forcing) method or the MMSE (Minimum Mean Square Error) method using a matrix of the propagation path response.

Each of the foregoing plural gateway stations may comprise an antenna control section that controls an antenna for feeder link so as to track the aerial-staying type communication relay apparatus.

The foregoing aerial-staying type communication relay apparatus may comprise an antenna for feeder link having plural directional beams respectively corresponding to the plural gateway stations, and an antenna control section that controls the antenna for feeder link so that each of the plural beams directs toward a corresponding gateway station. The foregoing antenna for feeder link may be a plurality of antennas for feeder link having directional beams in directions different from each other, and the foregoing antenna control section may mechanically control each of the plurality of antennas for feeder link so that each of the directional beams of the plurality of antennas for feeder link is directed toward a corresponding gateway station.

In the system, it is characterized that the foregoing antenna for feeder link is an array antenna capable of forming the plural directional beams respectively in arbitrary outward directions centered on a virtual axis in a vertical direction, and the forgoing antenna control section controls amplitudes and phases of transmission/reception signals for the plural antenna elements of the array antenna so that each of the plural directional beams is directed toward a corresponding gateway station.

The foregoing antenna for feeder link may be a plurality of array antennas capable of forming directional beams respectively in predetermined angle ranges centered on directions different from each other, and the antenna control section may selectively perform a control of amplitudes and phases of transmission/reception signals for plural antenna elements of each of the plurality of array antennas and a switching control of the plurality of array antennas, so that each of the directional beams of the plurality of array antennas is directed toward a corresponding gateway station.

Advantageous Effects of Invention

According to the present invention, it is capable of dynamically suppressing interferences in multi-feeder links on a same frequency between an aerial-floating type communication relay apparatus and plural gateway stations.

DESCRIPTION OF EMBODIMENTS

Hereinafter, embodiments of the present invention are described with reference to the drawings.

Figure 1:
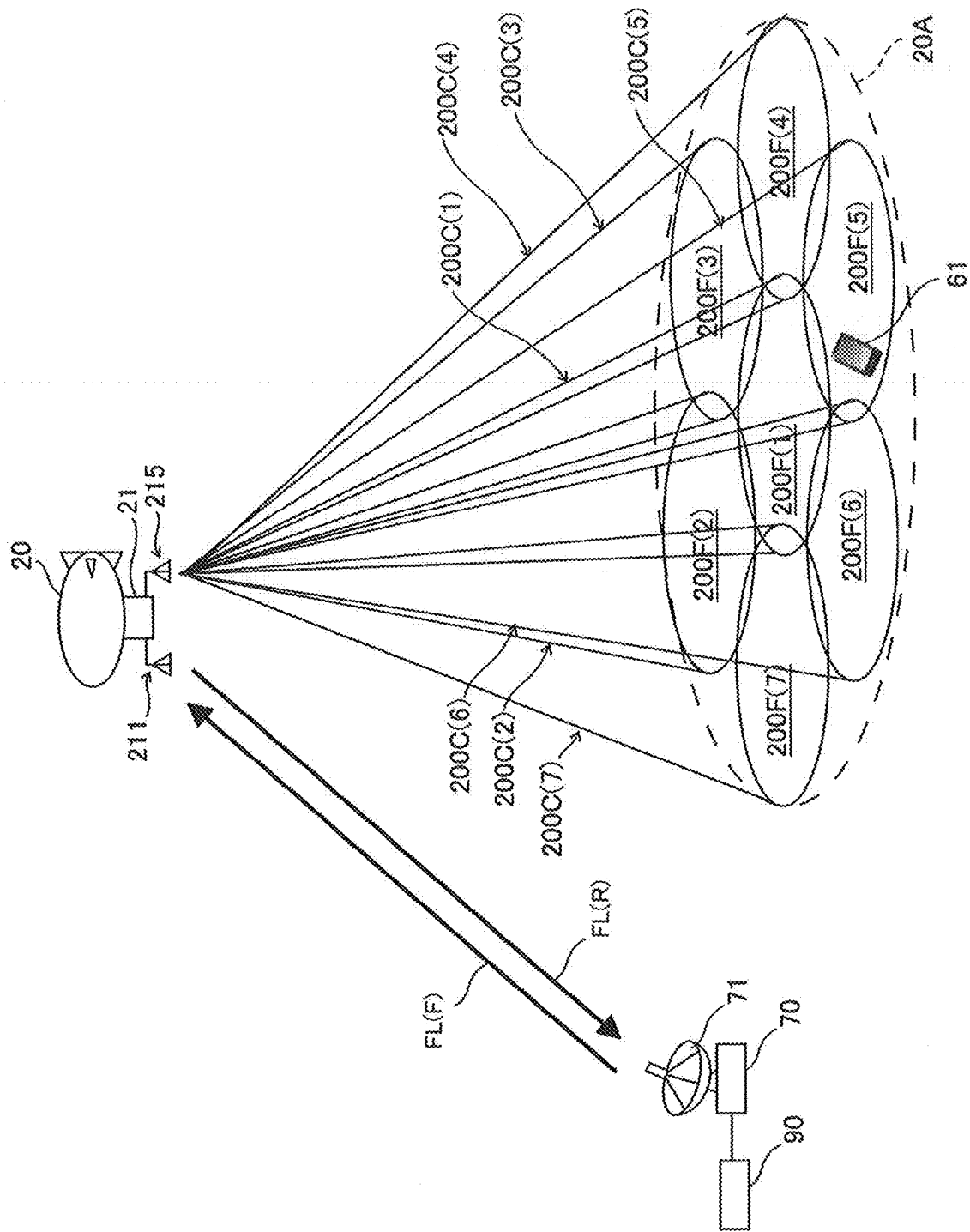
FIG. 1 is an illustration showing an example of a HAPS cell configuration in a communication system according to an embodiment of the present invention.

FIG. 1 is an illustration showing an example of a cell configuration of HAPS 20 in a communication system according to an embodiment of the present invention. The communication system according to the present embodiment is suitable for realizing a three-dimensional network of fifth-generation mobile communication that supports simultaneous connection to a large number of terminal apparatuses, and low delay, etc.

As shown in FIG. 1, the communication system is provided with High-Altitude Platform Stations (HAPS) (also called "high altitude pseudo satellite" or "stratified platform") 20 as plural aerial-floating type communication relay apparatuses (radio relay apparatuses). The HAPS 20 is located in an airspace at a predetermined altitude, and forms three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPSs according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace where the three-dimensional cell in the present embodiment is formed may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

The relay communication stations of the HAPS 20 respectively form plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. An area through which the beam passes in the cell-formation target airspace is a three-dimensional cell. The plural beams adjacent to each other in the cell-formation target airspace may be partially overlapped with each other.

Each of the relay communication stations 21 of the HAPS 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station on the ground (or on the sea) side.

The relay communication station 21 of the HAPS 20 is connected to a core network of a mobile communication network 80 via the feeder station 70, which is installed on the ground or on the sea, capable of radio communication by an antenna for feeder link (hereinafter referred to as "FL antenna") 211. A communication of feeder link between the HAPS 20 and the feeder station 70 may be performed by a radio communication using a radio wave such as a microwave, or may be performed by an optical communication using a laser light or the like.

Each of the HAPS 20 may autonomously control its own floating movement (flight) and a process in the relay communication station 21 by executing a control program with a control section including a computer or the like incorporated inside of the HAPS. For example, each of the HAPS 20 may acquire its own current position information (for example, GPS position information), position control information (for example, flight schedule information) stored in advance, position information on another HAPS located in a peripheral space or the like, and may autonomously control floating movement (flight) and process in the relay communication station 21 based on these pieces of information.

Further, the floating movement (flight) of each of the HAPS 20 and the process in the relay communication station 21 may be controlled by a management apparatus (also referred to as a "remote control apparatus") as a management apparatus provided in a communication center or the like of the mobile communication network. The management apparatus can be configured with, for example, a computer apparatus such as a PC, a server, or the like. In this case, the HAPS 20 may incorporate a communication terminal apparatus for control (for example, mobile communication module) so that it can receive control information from the management apparatus and transmit various pieces of information such as monitoring information to the management apparatus, and may be assigned terminal identification information (for example, IP address, phone number, etc.) so that it can be identified from the management apparatus. The MAC address of the communication interface may be used to identify the communication terminal apparatus for control.

Moreover, each of the HAPS 20 may transmit information regarding the floating movement (flight) of the own HAPS or a surrounding HAPS and/or the process at the relay communication station 21, and monitoring information such as information on statuses of the HAPS 20 and observation data acquired by various kinds of sensors, to a predetermined destination such as the management apparatus. The control information may include information on target flight route of the HAPS. The monitoring information may include at least one of information on current positions, flight-route history information, velocity relative to the air, velocity relative to the ground and propulsion direction of the HAPS 20, wind velocity and wind direction around the HAPS 20, and atmospheric pressure and temperature around the HAPS 20.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency or plural different base stations transmit signals to one terminal apparatus on the same time/same frequency.

It is noted that, in the following embodiments, although it is illustrated and described regarding some cases in which a communication relay apparatus having the relay communication station 21 that wirelessly communicates with the terminal apparatus 61 is an unmanned airship type HAPS 20, the communication relay apparatus may be a solar-plane type HAPS. Further, the following embodiments can be similarly applied to aerial-floating type communication relay apparatuses other than the HAPS.

A link between the HAPS 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, a spatial section between the HAPS 20 and the GW station 70 is referred to as a "radio section of feeder link". Further, a downlink of a communication from the GW station 70 to the terminal apparatus 61 via the HAPS 20 is referred to as a "forward link", and an uplink of a communication from the terminal apparatus 61 to the GW station 70 via the HAPS 20 is also referred to as a "reverse link".

In FIG. 1, although the communication relay apparatus is the unmanned-airship type HAPS 20, it may be a solar-plane type HAPS. Further, in the illustrated example, although the HAPS 20 is located in the stratosphere with an altitude of about 20 km, the HAPS 20 forms plural cells 200C(1) to 200C(7), and a diameter of a service area 20A consisting of footprints 200F(1) to 200F(7) of the cells 200C(1) to 200C(7) of the plural cells (7 cells) configuration is 100 to 200 km, it is not limited to these examples.

Figure 9:
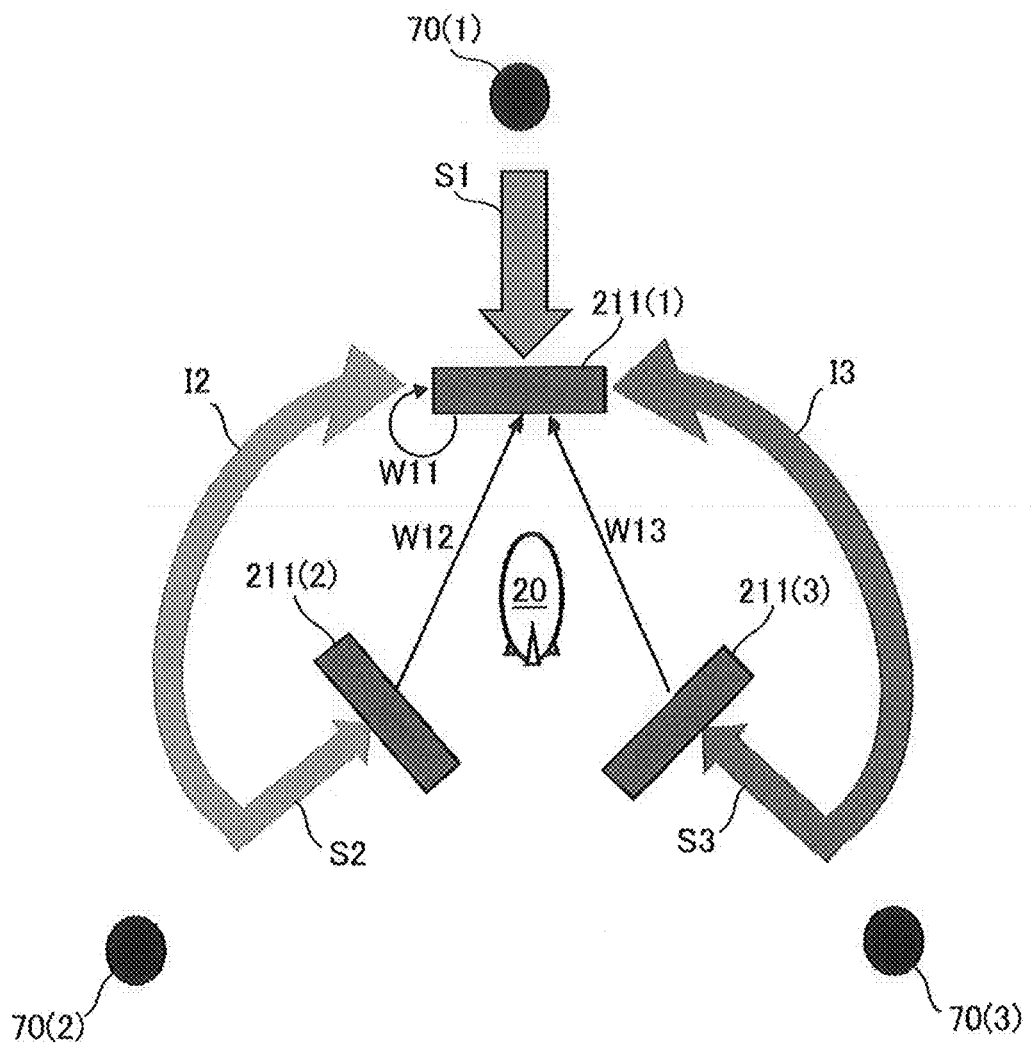
FIG. 9 is an illustration showing an example of a MIMO interference canceller applied by obtaining the weight W by an approximate expression.

In FIG. 1, a communication service that directly communicates with the terminal apparatus 61 on the ground (or on the water) using the HAPS 20 located in the stratosphere is very attractive as an expansion of service area and a communication means in the event of a disaster. The communication line of the HAPS 20 comprises a feeder link FL connecting the GW station 70 and the HAPS 20, and a service link SL connecting the HAPS 20 and the terminal apparatus 61. Since the communication capacity of the service link depends on the communication capacity of the feeder link which is the relay frequency, it is necessary to improve the frequency utilization efficiency of the feeder link. In particular, in case that the service link has a multi-cell configuration as shown in FIG. 9, the communication capacity of the feeder link tends to be insufficient, so that a frequency effective utilization technology for the feeder link is indispensable. However, in case that the HAPS 20 and the GW station 70 are configured one-to-one, it is difficult to improve the frequency utilization efficiency of the feeder link.

Therefore, in the present embodiment, a plural-gateway system (hereinafter also referred to as "plural-GW system") is constructed, which is configured with plural GW stations that transmit and receive relay signals different from each other on a same frequency to and from the HAPS 20 in the feeder link, and performs a spatial-division multiplex communication in a multi-feeder link formed between one HAPS 20 and plural GW stations. In the plural-GW system, by eliminating interference between the plural feeder links, the frequency utilization efficiency can be improved depending on the number of GW stations to be installed.

It is noted that, in the following embodiments, although it is described regarding some cases in which the spatial-division multiplex communication between the HAPS 20 and the plural GW stations is performed only by a forward link of the feeder link, the spatial-division multiplex communication may be performed only by a reverse link of the feeder link, or may be performed by both of the forward link and the reverse link.

Figure 2B:
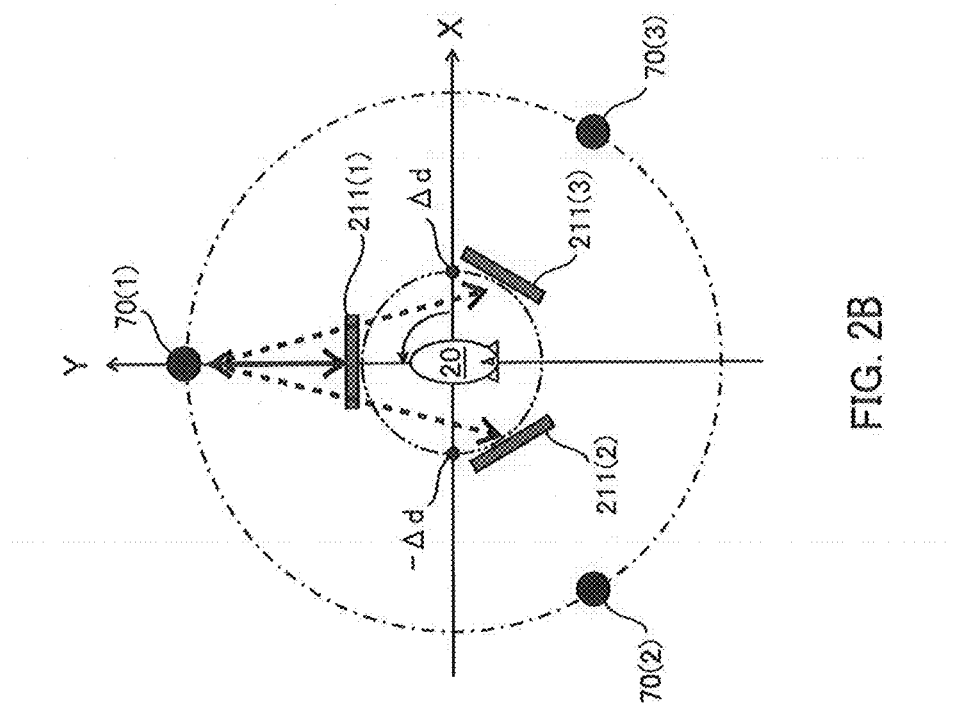
FIG. 2B is a top view illustration of a relationship between plural antennas for feeder link of HAPS and plural GW stations.
Figure 2A:
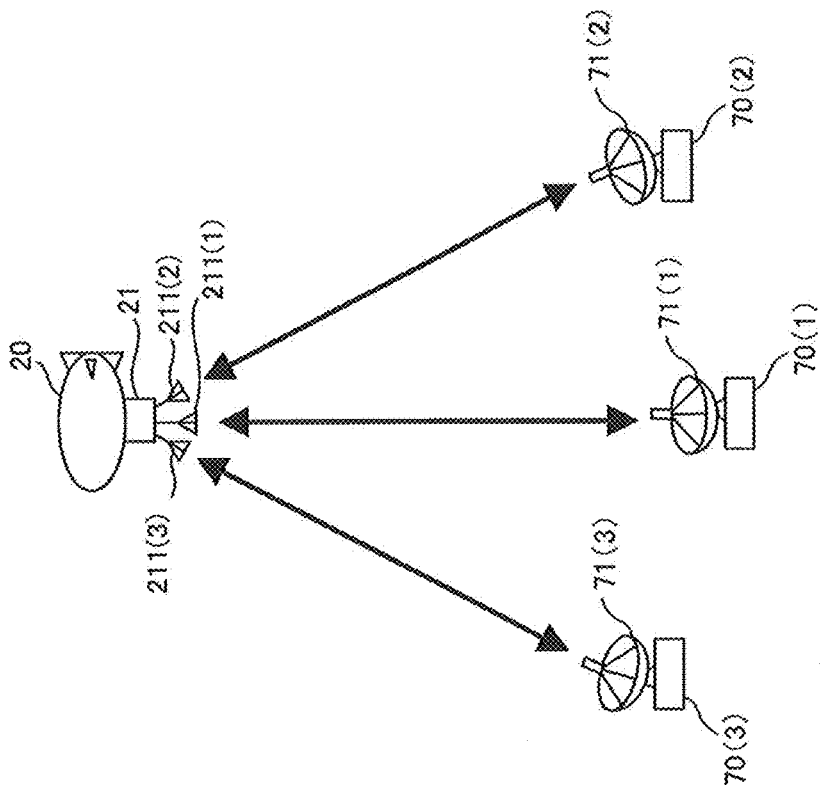
FIG. 2A is a side view showing an example of a schematic configuration of a plural-GW system according to the embodiment.

FIG. 2A is a side view showing an example of a schematic configuration of a plural-GW system according to the embodiment, and FIG. 2B is a top view illustration of a relationship between plural FL antennas 211(1) to 211(3) of the HAPS 20 and plural GW stations 70(1) to 70(3). In the illustrated example, each of the number of FL antennas (N) and the number of GW stations (N) is the same number (3 in the illustrated example), and the same number of FL antennas 211(1) to 211(3) and GW stations 70(1) to 70(3) are provided in a one-to-one correspondence with each other. The number of sets of the FL antenna 211 and the GW station 70 may be two sets, or may be four or more sets. Further, in the illustrated example, although the plural GW stations 70 are disposed so that distances from the HAPS 20 and intervals between the GW stations are equal to each other, at least one of the distances and the intervals may be different from each other. Each GW station 70 is disposed so that complex amplitudes received by each FL antenna 211 (also referred to as "HAPS station antenna") of the HAPS 20 are uncorrelated. Further, the antennas for feeder link (hereinafter referred to as "GW antennas") 71(1) to 71(3) of the GW stations 70(1) to 70(3) can transmit and receive radio signals with two kinds of polarized waves of vertically polarized waves (V) and horizontally polarized waves (H) which are orthogonal to each other. In the illustrated example, although the plural FL antennas 211(1) to 211(3) of the HAPS 20 are disposed so that distances from the center of the HAPS 20 and intervals between the FL antennas are equal to each other, at least one of the distances and the intervals may be different from each other between the FL antennas. For example, the distances and the intervals may be different from each other between the FL antennas.

Figure 3:
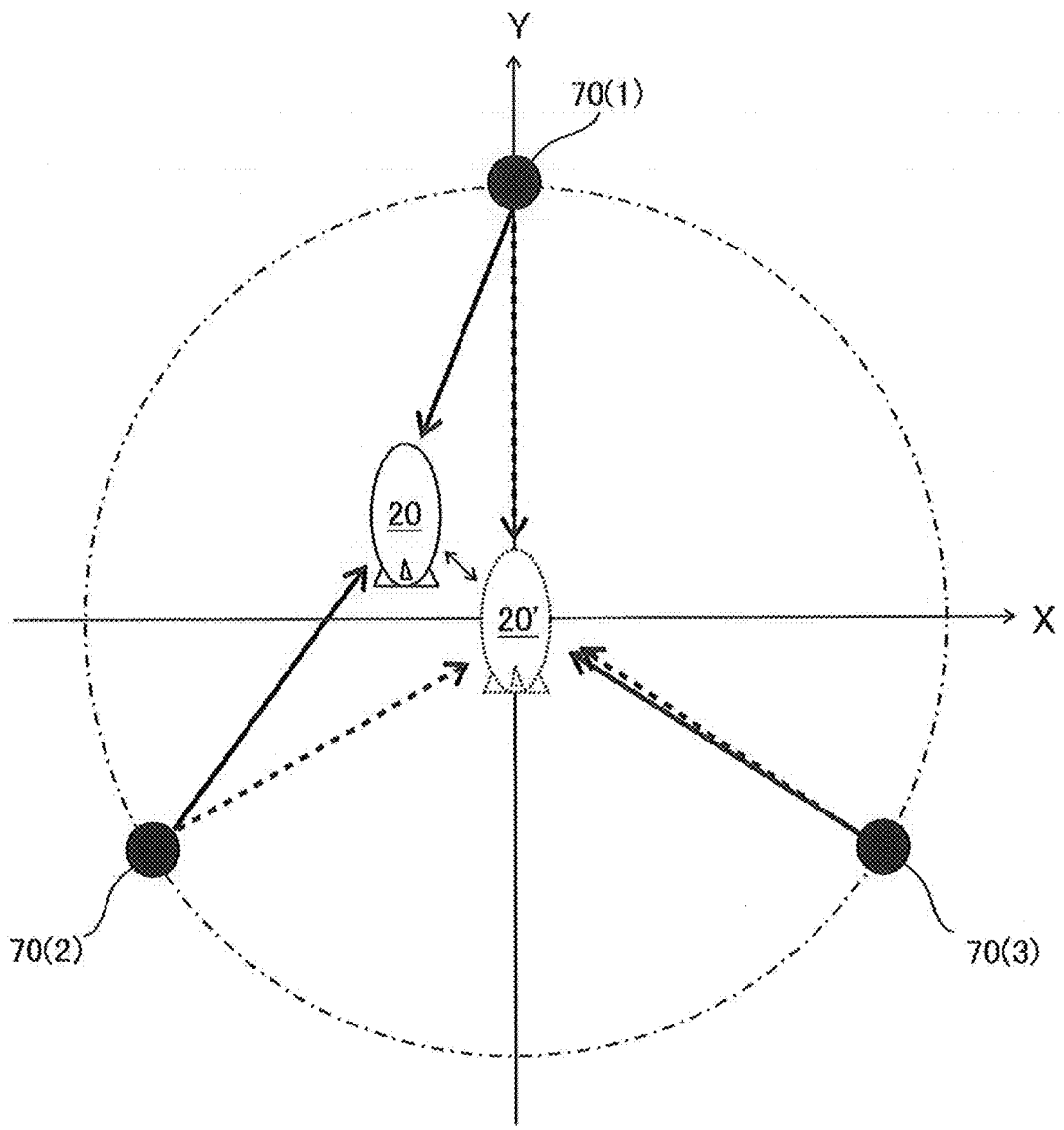
FIG. 3 is an illustration showing an example of state in which GW antennas of plural GW stations track HAPS according to the embodiment.

As shown in FIG. 3, each of the plural GW stations 70(1) to 70(3) may include an antenna control section that controls the GW antennas 71(1) to 71(3) so as to track the HAPS 20 moving in an airspace. A HAPS 20' with dashed lines in the figure indicates a position before the movement, and a HAPS 20 with solid lines in the figure indicates a position after the movement. By tracking the HAPS 20 by each of the GW antennas 71(1) to 71(3), even when using the GW antennas 71(1) to 71(3) with high directivity such as a parabolic antenna, it is capable of suppressing the deterioration of the communication quality of the feeder link due to the movement of the HAPS 20.

Figure 4:
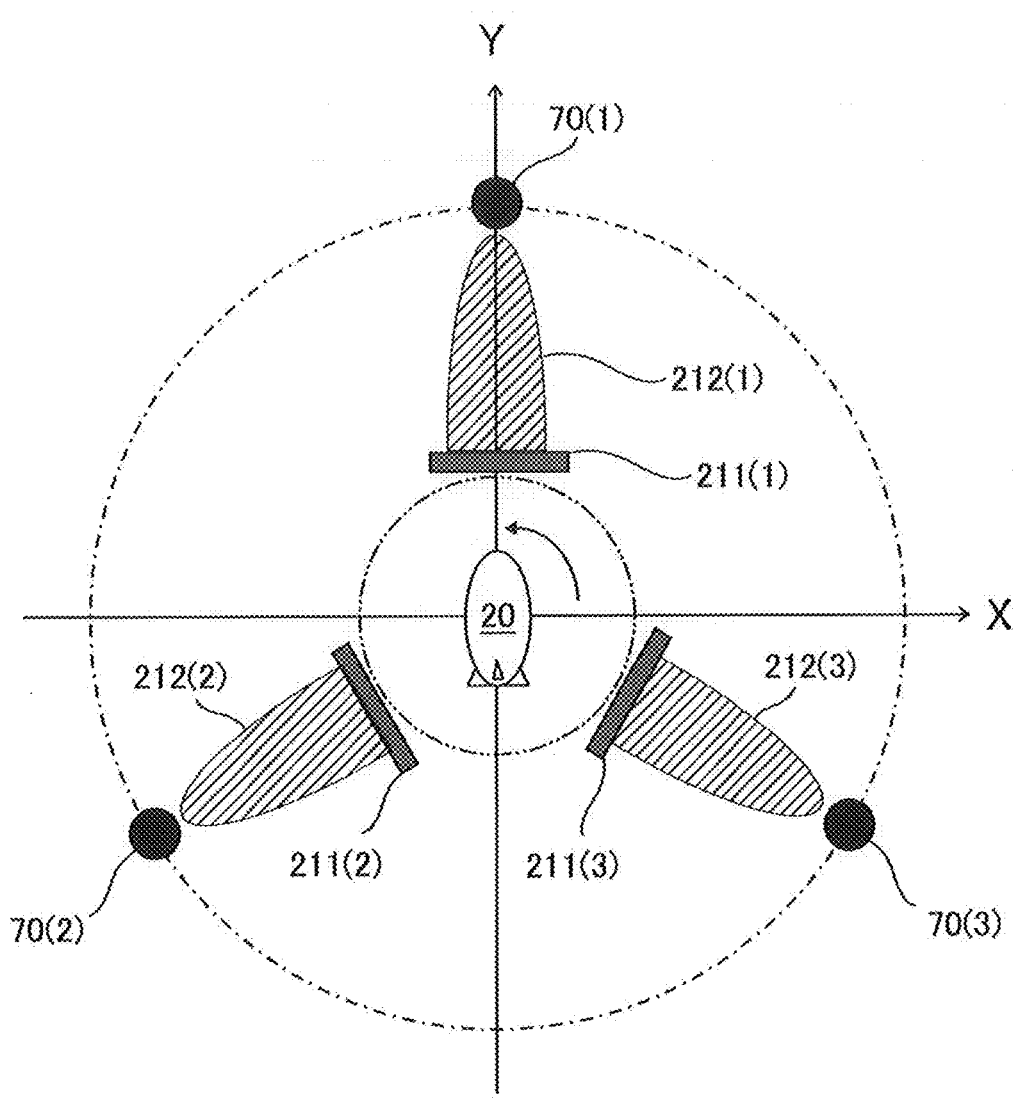
FIG. 4 is an illustration showing an example of directional beams of plural FL antennas of HAPS according to the embodiment.

As shown in FIG. 4, the plural FL antennas 211(1) to 211(3) of the HAPS 20 may include antenna directional beams (hereinafter referred to as "directional beams" or "beams") 212(1) to 212(3) respectively corresponding to the GW stations 70(1) to 70(3), and the HAPS 20 may include an antenna control section that controls the FL antennas 211(1) to 211(3) so that the directional beams 212(1) to 212(3) of the plural FL antennas 211(1) to 211(3) is respectively directed in the direction of the corresponding GW stations 70(1) to 70(3). Each of the directional beams 212(1) to 212(3) of the FL antennas 211(1) to 211(3) is formed, for example, so as to face the GW station 70 closest to itself and not to provide interferences to other GW stations, that is, so that a ratio (F/B) of a gain of the main beam to a gain in the opposite direction becomes sufficiently large. As a result, even when the HAPS 20 moves or rotates, it is possible to suppress the deterioration of the communication quality of the feeder link due to the movement and rotation of the HAPS 20.

As a control system of the directional beams 212(1) to 212(3) of the plural FL antennas 211(1) to 211(3) by the antenna control section of the HAPS 20, it is capable using various systems such as a gimbal system, an electric system (360-degrees beamforming control system), and an electric system (angle-limited beamforming control system+antenna switching).

Figure 5:
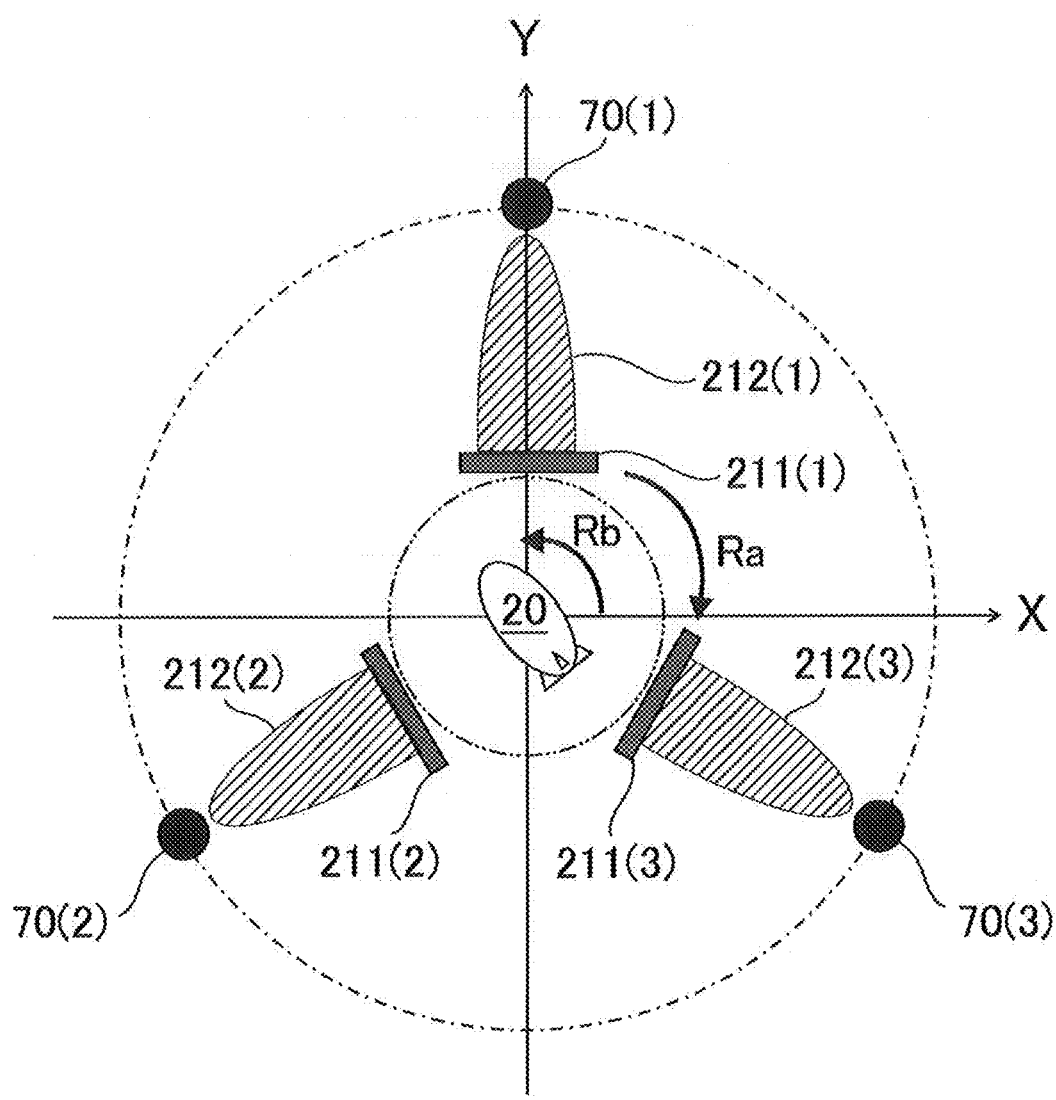
FIG. 5 is an illustration showing an example of directional beam control of a FL antenna in HAPS according to the embodiment.

For example, in the gimbal system in FIG. 5, in accordance with the rotation (turning) around the vertical axis (yawing axis, Z axis) of the HAPS 20, the rotation drive of the whole of plural FL antennas 211(1) to 211(3) can be mechanically controlled around the foregoing axis. For example, in FIG. 5, when the HAPS 20 rotates about 45 degrees in the left direction of rotation (counterclockwise direction) Rb, the rotation of the whole of plural FL antennas 211(1) to 211(3) are mechanically driven in the right direction of rotation (clockwise direction) Ra opposite to the foregoing direction of rotation of the HAPS 20.

Although the rotational drive control for angle adjustment of each of the FL antenna 211(1) to 211(3) may be performed with reference to information on a position and an orientation of the HAPS, the rotational drive control of respective FL antenna 211(1) to 211(3) may be performed with reference to reception level values of the FL antennas 211(1) to 211(3). For example, each FL antenna 211(1) to 211(3) is rotated in small steps, an angle for maximizing the reception level of each of the FL antenna 211(1) to 211(3) is found, and the rotational drive control of each of the FL antenna 211(1) to 211(3) is performed so as to face the angle. Herein, a threshold value may be set for each of the reception levels of each of the FL antenna 211(1) to 211(3), each of the FL antenna 211(1) to 211(3) may be rotated by a predetermined angle when the reception level falls below the foregoing threshold value, and the rotational drive control of the FL antenna 211(1) to 211(3) may be performed to the directional angle at which the reception level is maximized. The threshold value of the reception level may be obtained, for example, by an experiment in advance, and the predetermined angle may be, for example, 360 degrees/the number of FL antennas (120 degrees in the illustrated example). Further, a monitoring beam for comparing the reception level from the GW stations other than the corresponding GW station may be generated from the FL antenna 211(1) to 211(3), a GW station having the maximum level may be selected, and the rotational drive of each of the FL antenna 211(1) to 211(3) may be controlled so that the directional beam is directed in the direction to the selected GW station.

It is noted that, although the angle adjustment in the horizontal direction of each of the FL antenna 211(1) to 211(3) is shown in FIG. 5, the angle adjustment in the vertical direction may be also performed in the same manner.

By the rotational drive control of the FL antennas 211(1) to 211(3), even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 6:
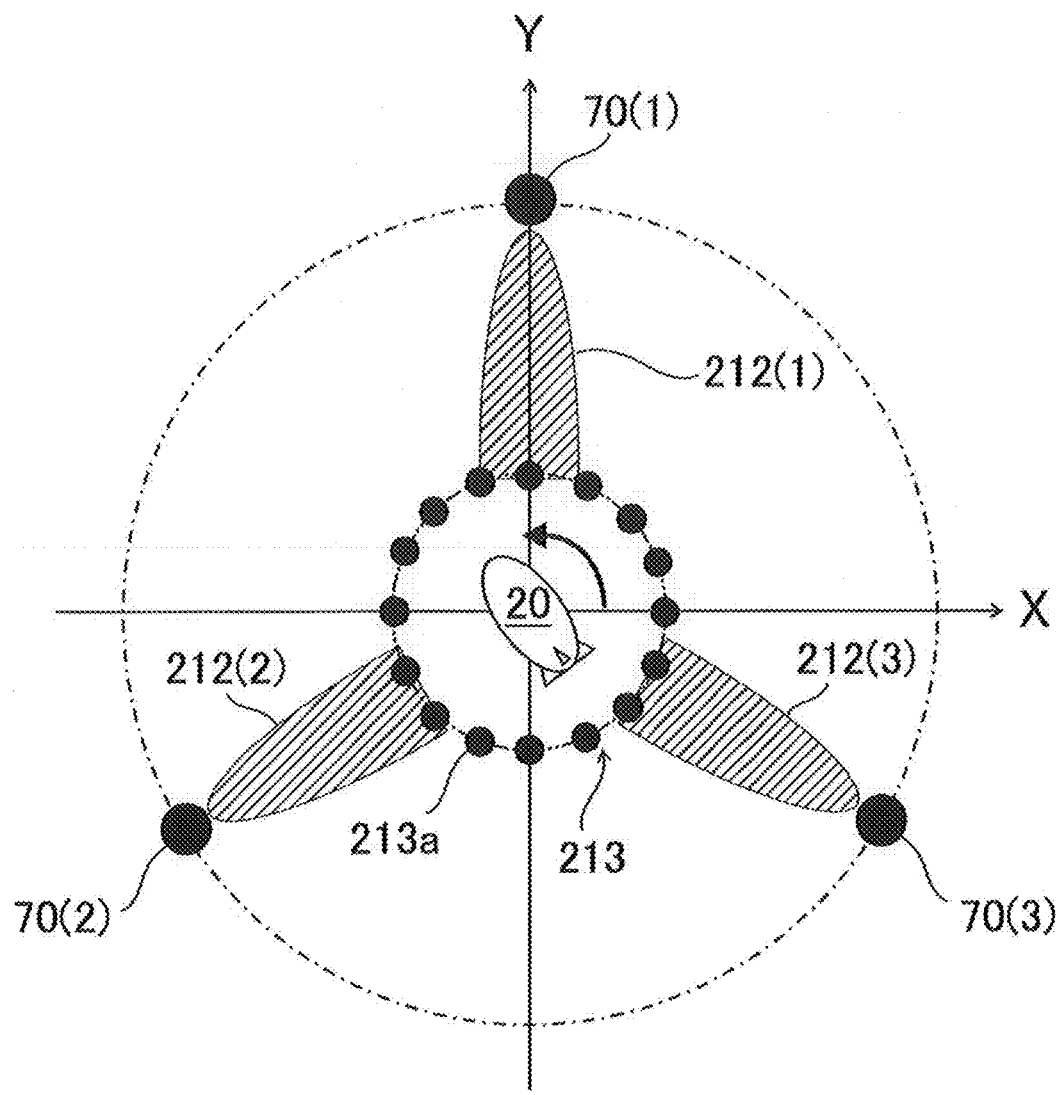
FIG. 6 is an illustration showing another example of directional beam control of a FL antenna in HAPS according to the embodiment.

In the electric system (360-degrees beamforming control system) in FIG. 6, a circular array antenna 213, in which plural antenna elements 213a are disposed along the circumferential shape, is provided as a FL antenna. Based on information on a position and an attitude of the HAPS 20, a weight applied to signals (amplitude, phase) transmitted and received via each of the plural antenna elements 213a is controlled. For example, the information on the position and the attitude of the HAPS 20 may be acquired based on an output of a GNSS Inertial Navigation System (GNSS/INS) that is a combination of a GNSS (Global Navigation Satellite System) system and an Inertial Measurement Unit (IMU) incorporated in the HAPS 20.

Although the weight control of each antenna element 213a of the circular array antenna 213 may be performed with reference to the information on the position and the attitude of the HAPS, the weight control of each antenna element 213a may be performed so as to form a directional beam having the maximum reception level at a directional position corresponding to each GW station with reference to the reception level value of each antenna element 213a of the circular array antenna 213. For example, a phase of each antenna element 213a of the circular array antenna 213 is changed in small steps, an angle for maximizing the reception level is found, and the weight control of each antenna element 213a is performed so that a beam is formed in the direction of the found angle. Further, a monitoring beam for comparing the reception level from the GW stations other than the corresponding GW station may be generated from the circular array antenna 213, a GW station having the maximum level may be selected, and a beam may be formed in the direction to the selected GW station.

It is noted that, although the beam angle adjustment in the horizontal direction is shown in FIG. 6, the beam angle adjustment may be also performed in the same manner in the vertical direction.

By controlling the weight of each antenna element 213a of the circular array antenna 213, the directional beams 212(1) to 212(3) respectively directed in the directions to the plural GW stations 70(1) to 70(3) are formed. As a result, even if the HAPS 20 rotates, since the directional beams 212(1) to 212(3) of the FL antennas 211(1) to 211(3) are directed in the corresponding directions to the GW stations 70(1) to 70(3) respectively, the deterioration of the communication quality of the feeder link can be prevented.

Figure 7:
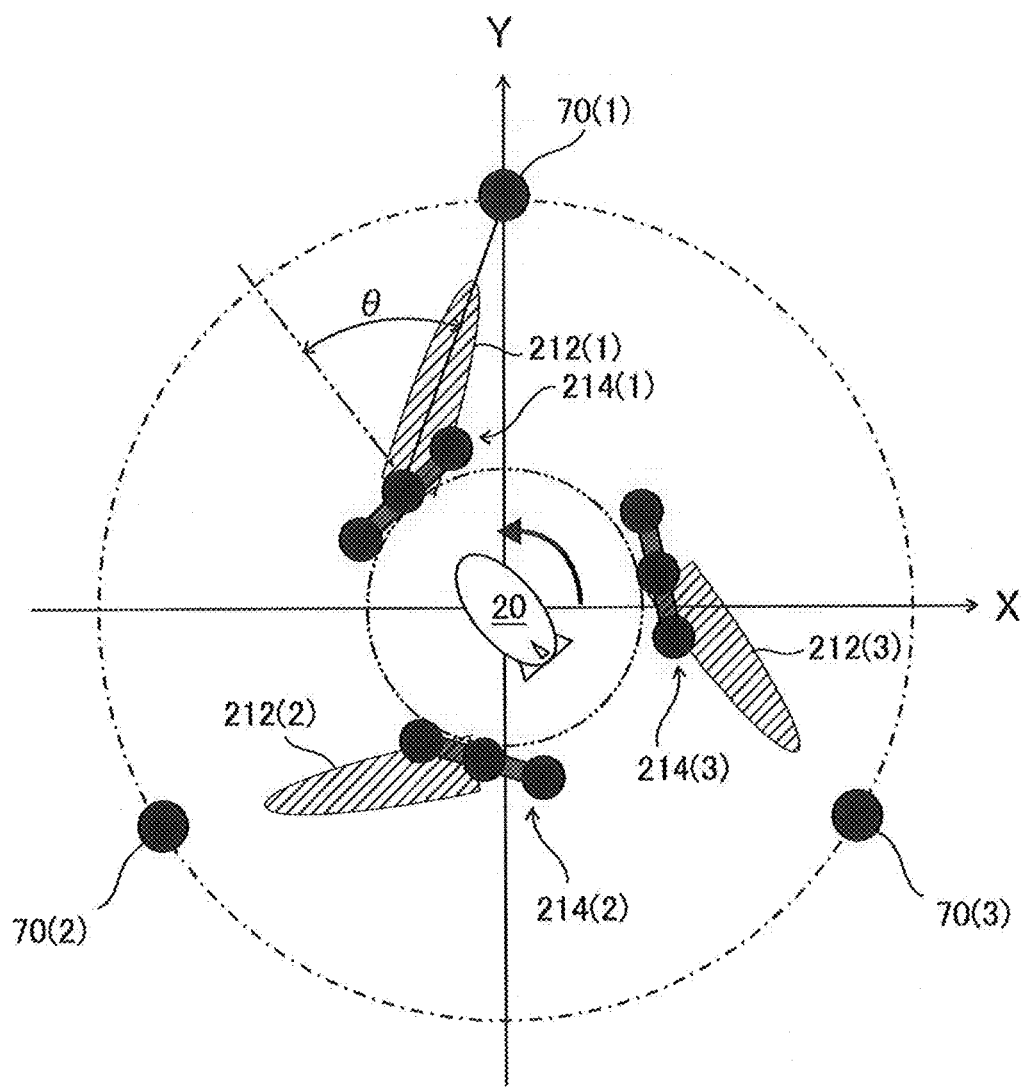
FIG. 7 is an illustration showing yet another example of directional beam control of a FL antenna in HAPS according to the embodiment.

In the electric system (beamforming control system with limited angle+antenna switching) of FIG. 7, plural planar array antennas 214(1) to 214(3), in which plural antenna elements 214a of each array antenna are two-dimensionally disposed in a plane, are provided as a FL antenna. Based on information on the position and the attitude of the HAPS 20 acquired by GNSS/INS etc., a beamforming control is performed to control a weight applied to a signal (amplitude, phase) transmitted and received via each of the plural antenna elements 214a of the plural planar array antennas 214(1) to 214(3).

Although the control of the switching and the beamforming of the planar array antennas 214(1) to 214(3) may be performed with reference to the information on the position and the attitude of the HAPS, the antenna switching and beamforming may be controlled so that each of the planar array antennas 214(1) to 214(3) has the maximum reception level with reference to the reception level value of each planar array antenna 214(1) to 214(3). For example, each of the planar array antenna 214(1) to 214(3) is rotated in small steps, an angle for maximizing the reception level of respective planar array antenna 214(1) to 214(3) is found, and the rotational drive control of each antenna is performed so as to be directed to the found angle. Herein, a threshold value may be set for each of the reception levels of each of the planar array antenna 214(1) to 214(3), when the reception level falls below the foregoing threshold value, the planar array antennas 214(1) to 214(3) may be switched and each of the planar array antenna 214(1) to 214(3) may be rotated by a predetermined angle, and a beamforming may be performed to form a beam to the directional angle at which the reception level is maximized. The threshold value of the reception level may be obtained, for example, by an experiment in advance, and the predetermined angle may be, for example, 360 degrees/the number of FL antennas (120 degrees in the illustrated example). Further, a monitoring beam for comparing the reception level from the GW stations other than the corresponding GW station may be generated from the planar array antenna 214(1) to 214(3), a GW station, for which each of the planar array antenna 214(1) to 214(3) has the maximum level, may be selected, and an antenna switching and a beamforming may be performed so as to form a beam in the direction to the selected GW station.

It is noted that, although the beam angle adjustment in the horizontal direction is shown in FIG. 7, the beam angle adjustment may be also performed in the same manner in the vertical direction.

By controlling the switching and the beamforming of the planar array antennas 214(1) to 214(3), the directional beams 212(1) to 212(3) respectively directed in the directions to the plural GW stations 70(1) to 70(3) are formed. Herein, for example, when the angle (θ in the figure) at which the directional beam 212(1) is tilted with respect to the normal direction perpendicular to the plane of the planar array antenna 214(1) becomes larger than the preset predetermined angle θth degrees, the FL antenna corresponding to the GW station 70(1) is switched to the planar array antenna 214(2). As a result, even if the HAPS 20 rotates, each of the directional beams 212(1) to 212(3) of the FL antennas 211(1) to 211(3) are directed in the directions to the corresponding GW stations 70(1) to 70(3), so that the deterioration of the communication quality of the feeder link can be prevented.

Figure 8:
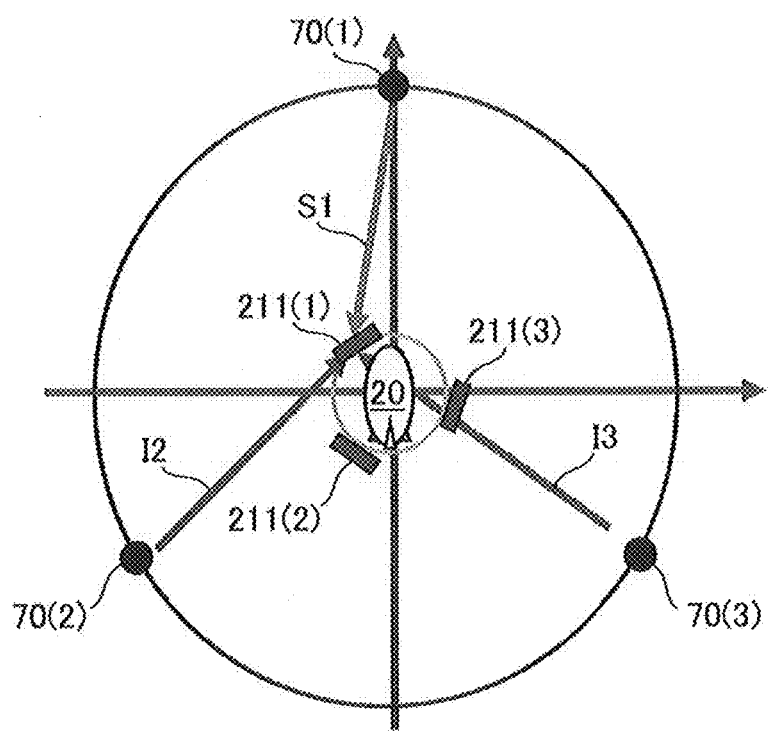
FIG. 8 is an illustration of an example of interference between GW stations (between feeder links) in the plural-GW system.

In the plural-GW system having the above-described configuration, interference between GW stations (between feeder links) may increase. For example, as shown in FIG. 8, while a desired signal (desired signal) S1 transmitted from the GW station 70(1) is received by the FL antenna 211(1) of the HAPS 20, signals transmitted from the other GW stations 70(2) and 70(3) are received by the FL antenna 211(1) as interference signals I2 and I3. Therefore, SINR characteristics of the feeder link may deteriorate.

Therefore, in the present embodiment, by applying a MIMO interference canceller supporting the line-of-sight environment (LOS: Line-Of-Sight) between the GW stations (between the feeder links) as shown below, and by reducing the interferences between the GW stations (between the feeder links), the SINR characteristics of the feeder link are improved.

Figure 10:
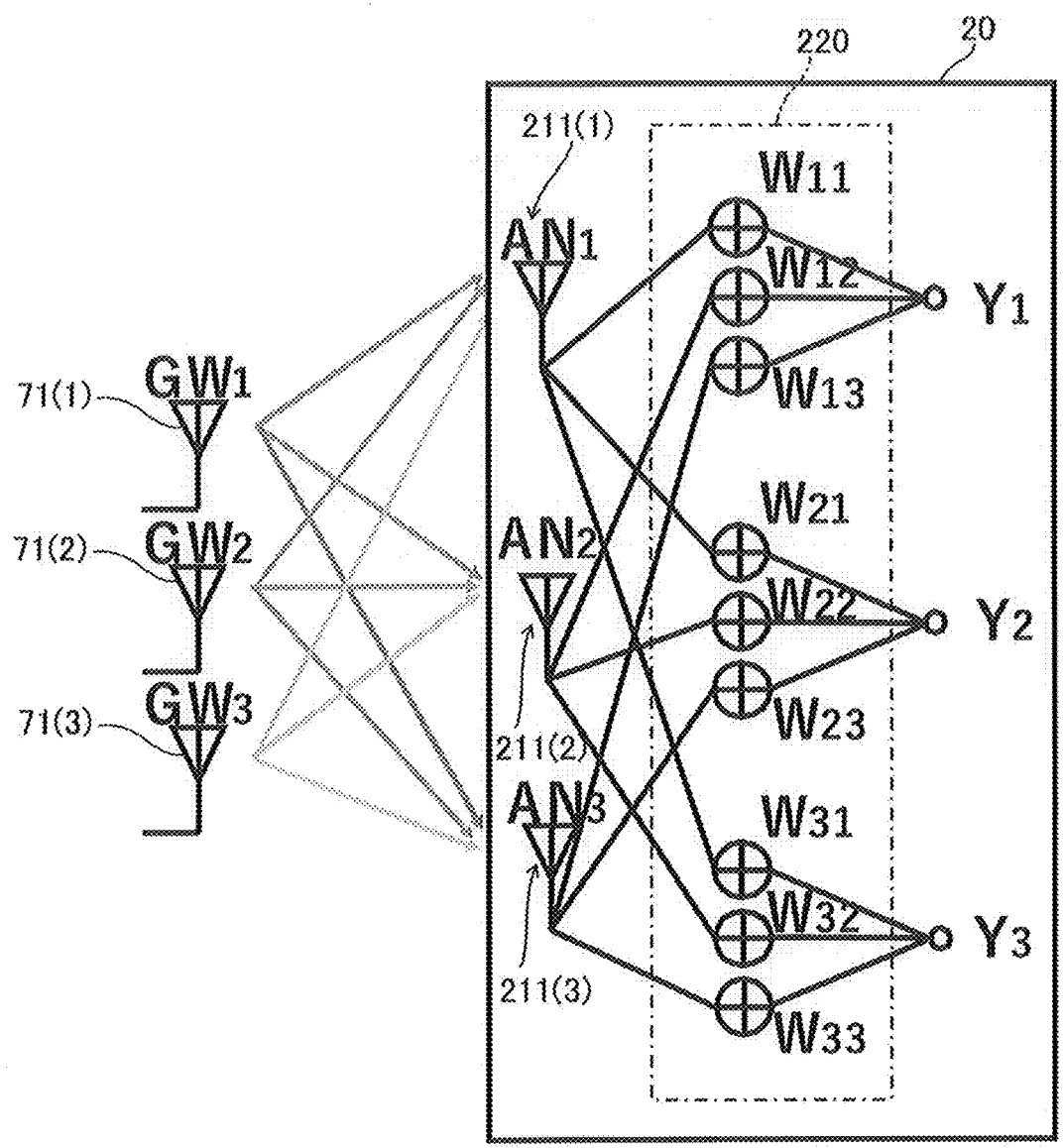
FIG. 10 is an illustration showing an example of a schematic configuration of an interference canceller section mounted on HAPS.

FIG. 9 is an illustration showing an example of a MIMO interference canceller applied by obtaining the weight W by an approximate expression. FIG. 10 is an illustration showing an example of a schematic configuration of an interference canceller section 220 mounted on the HAPS 20.

The FL antenna 211(1) of the HAPS 20 receives a desired signal S1(Y11) transmitted from the GW station 70(1), an interference signal I2(Y12) transmitted from the GW station 70(2), and an interference signal I3(Y13) transmitted from the GW station 70(3). The reception signal AN1 is represented by the following equation (1).

$$AN1 = S1 + I2 + I3 \quad (1)$$

In the interference canceller section 220 of the HAPS 20, by multiplying and subtracting the weights W2 and W3 corresponding to the signals S2 and S3 respectively received by the other FL antennas 211(2) and 211(3) as shown in the following equation (2), the desired signal S1(Y11), in which the interference signals I2 and I3 are cancelled, can be output. Similarly, the interference signals from other GW stations can be canceled for the desired signals S2(Y22) and S3(Y33) transmitted from the GW stations 70(2) and 70(3).

$$S1 = w11 \cdot AN1 + w12 \cdot AN2 + w13 \cdot AN3 \quad (2)$$

Figure 11:
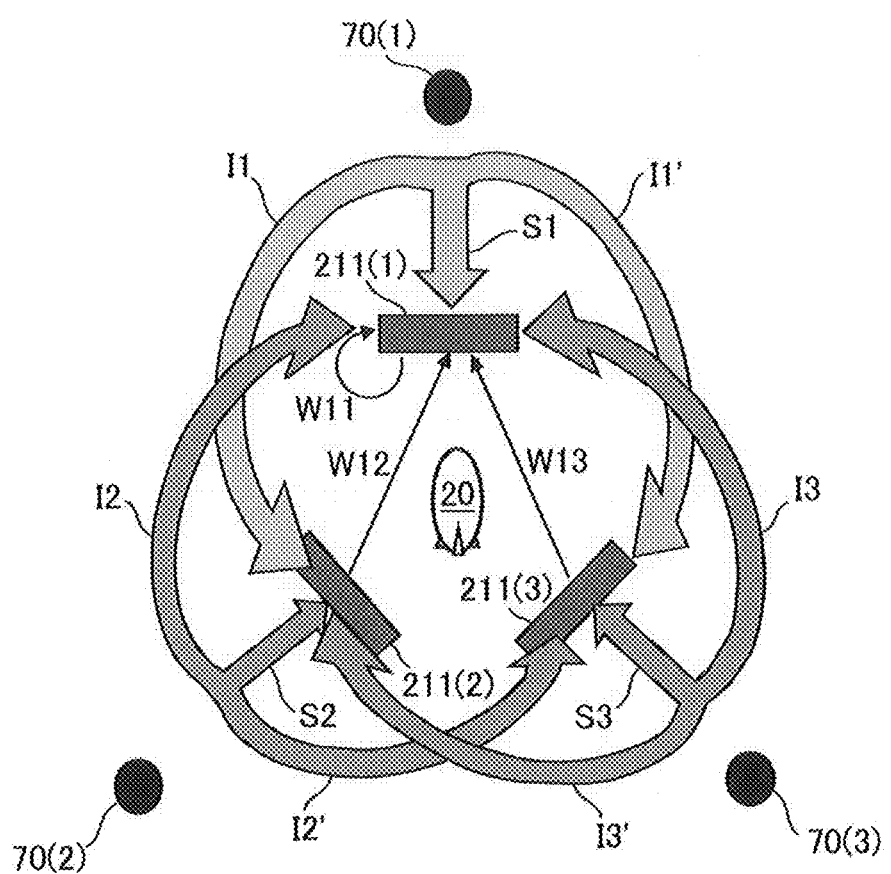
FIG. 11 is an illustration showing an example of a MIMO interference canceller applied by obtaining the weight W by the ZF method.

FIG. 11 is an illustration showing an example of a MIMO interference canceller applied by obtaining a weight W by the ZF (Zero-Forcing) method. For example, a signal transmitted from the GW station 70(1) is not only received as the desired signal S1(Y11) by the FL antenna 211(1) of the HAPS 20, but also received as interference signals I1(Y12) and I1'(Y13) by the FL antennas 211(2) and 211(3). Further, a signal transmitted from the GW station 70(2) is not only received as an interference signal I2(Y21) by the FL antenna 211(1), but also received as an interference signal I2'(Y23) by the FL antenna 211(3). Moreover, a signal transmitted from the GW station 70(3) is not only received as an interference signal I3(Y31) by the FL antenna 211(1), but also received as an interference signal I3'(Y32) by the FL antenna 211(2). In the MIMO interference canceller in FIG. 11, considering these interference signals I1, I1', I2' and I3', the desired signal S1(Y11) is output, for example, as shown in the following equation (3). As a result, the accuracy of interference suppression between the GW stations (between the feeder links) can be improved.

$$S1 = w11(Y11+Y12+Y13) + w12(Y21+Y22+Y23) + w13(Y31+Y32+Y33) \quad (3)$$

In order to calculate the weight W used for the MIMO interference canceller, it is necessary to grasp a propagation path response H between the FL antennas 211(1) to 211(3) of the HAPS 20. In particular, in the plural-GW system in the present embodiment, since the airframe of the HAPS 20 moves relative to the GW stations 70(1) to 70(3), the propagation path response also changes in accordance with to the movement.

Figure 12:
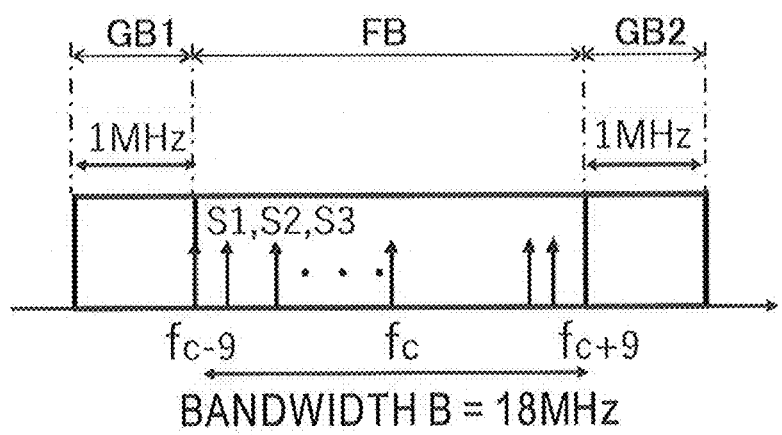
FIG. 12 is an illustration showing an example of a transmission signal band of a feeder link in the plural-GW system according to the embodiment.

Therefore, in the present embodiment, a pilot signal is transmitted from each of the GW station 70(1) to 70(3) in order to grasp the propagation path response. The frequency band of the pilot signal is a narrow band, and each pilot signal has a different transmission frequency from each other (orthogonal). The relay communication station 21 of the HAPS 20 estimates the propagation path response of the center frequency fsc (see fc in FIG. 12) of the transmission signal band FB of the feeder link based on the pilot signal received from each of the GW station 70(1) to 70(3), and derives the weight W.

The larger the difference between the frequency for obtaining the weight W and the transmission signal band of the feeder link, the smaller the amount of interference cancellation. For example, in the plural-GW system in FIG. 2A and FIG. 2B described above, three GW stations 70(1) to 70(3) are installed at every 120°, and three FL antennas 211(1) to 211(3) of the relay communication station 21 of the HAPS 20 are installed at every 120° on the circumference of the radius Δd. Since the airframe of the HAPS 20 generally flies while rotating in the stratosphere, for example, as shown in FIG. 5 described above, the FL antennas 211(1) to 211(3) of the relay communication station 21 control the beam so that the main beam faces the opposing GW stations 70(1) to 70(3). Herein, rotation angle Φ of the airframe of the HAPS 20 is a relative rotation angle with each GW station direction as 0°. With the rotation of the airframe of the HAPS 20, the propagation path (phase mainly due to the difference in path length) of each FL antennas 211(1) to 211(3) on the circumference of the radius Δd changes. Since the weight W is determined by the frequency of the pilot signal (hereinafter referred to as "pilot frequency"), the amount of interference cancellation in a signal band different from the pilot frequency decreases, the larger the frequency difference and the smaller the amount of cancellation.

Figure 13:
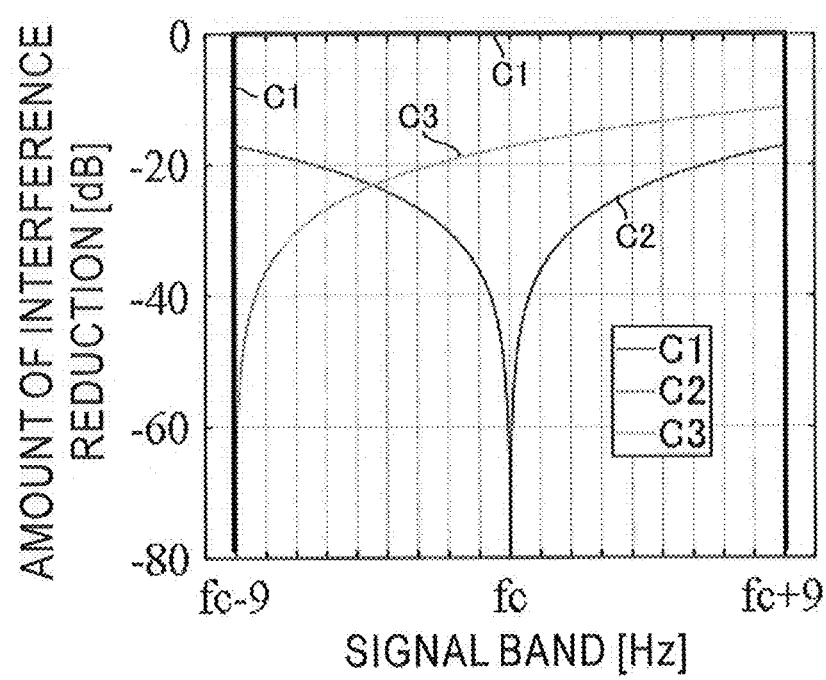
FIG. 13 is a graph showing an example of computer simulation results that evaluates an interference reduction effect when the weights are obtained at pilot frequencies different from each other according to the embodiment.
Figure 14:
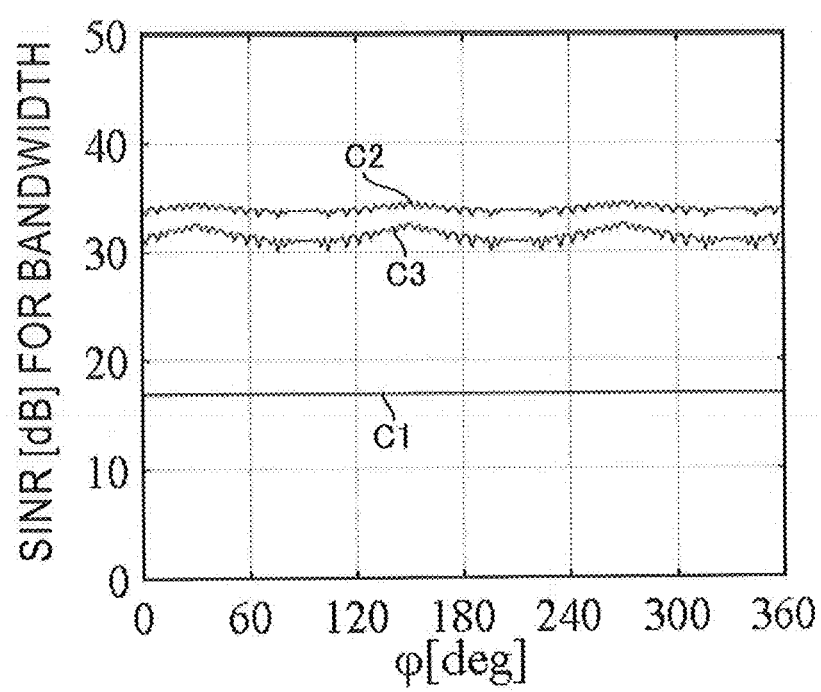
FIG. 14 is a graph showing an example of computer simulation results of a SINR characteristic of an entire transmission signal band of a feeder link when an airframe of HAPS is rotated.

FIG. 13 is a graph showing an example of computer simulation results for evaluating interference reduction effect when the weights are obtained at pilot frequencies different from each other according to the embodiment. Further, FIG. 14 is a graph showing an example of computer simulation results of a SINR characteristic of an entire transmission signal band of the feeder link when the airframe of the HAPS 20 is rotated. The evaluation parameters are shown in Table 1.

TABLE 1

| Evaluation Parameter | Value |
| --- | --- |
| Number of ground stations (GW stations) | 3 |
| Disposed radius R of ground stations (GW stations) | 100 km |
| Number of antennas of HAPS relay communication station | 3 |
| Disposed radius r of antennas of HAPS relay communication station | 0.5 m |
| Carrier frequency | 3.3 GHz |
| Bandwidth B of transmission signals | 18 MHz |
| Gain of antenna | 20 dBi |
| Front-back ratio (F/B ratio) of antenna | 20 dB |
| S/N ratio | 20 dB |

A radius $\Delta d$ of the FL antenna (relay antenna) 211 is 0.5 [m], a gain of the FL antenna 211 is 20 [dBi], and a front-back ratio (F/B ratio) is 20 [dB]. Assuming that a reception SNR of the relay communication station 21 received by an omnidirectional antenna is 20 [dB], a reception SNR of the relay communication station 21 received by the FL antenna 211 is 40 [dB]. Further, the transmission signal bandwidth of the feeder link is set to 18 [MHz]. As an example, evaluate in case that the pilot frequency is set at the edge and the center of the transmission signal bandwidth of the feeder link As shown in FIG. 13, it can be seen that the amount of interference reduction in the transmission signal band of the feeder link differs depending on the pilot frequency. In case that the pilot frequency is set to the center of the transmission signal band (C2 in the figure), interference can be reduced over the entire transmission signal bandwidth. Further, in case that the pilot frequency is set to the center of the transmission signal band (C2 in the figure) as shown in FIG. 14, it can be seen that the SINR can be improved by 15 dB or more as compared with the case without the interference canceller.

Figure 15:
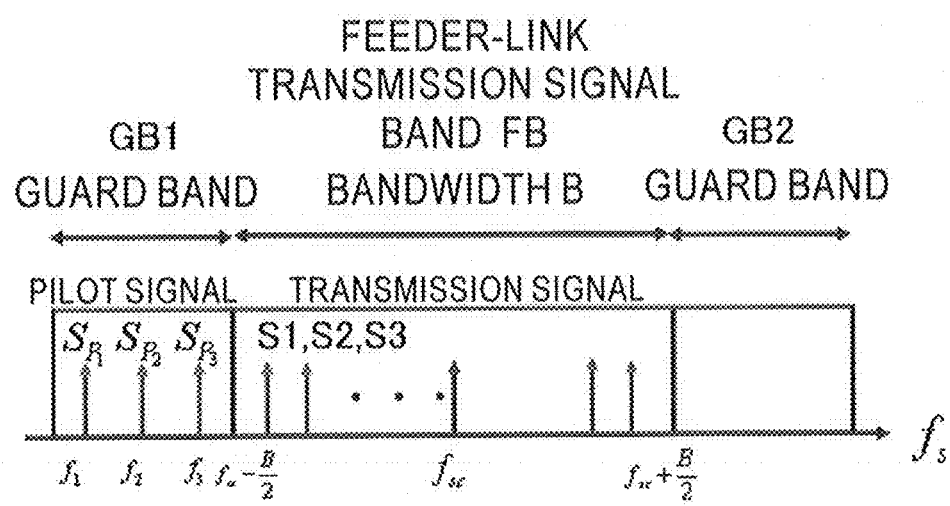
FIG. 15 is an illustration showing an example of frequencies of respective pilot signals when each of plural GW stations transmits a single pilot signal according to a comparative example.
Figure 16:
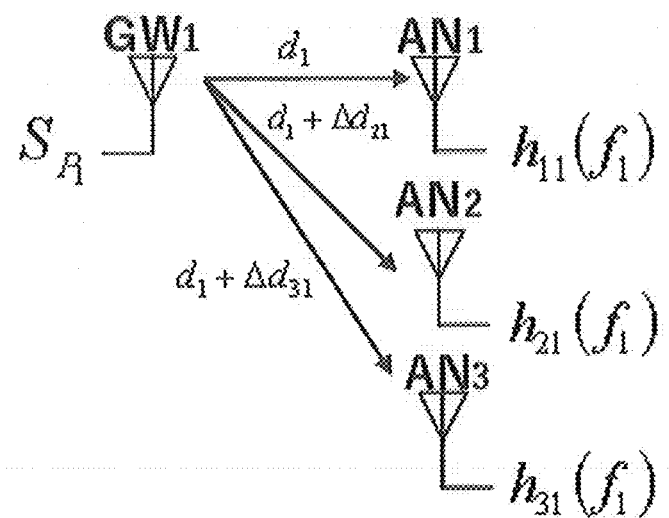
FIG. 16 is an illustration showing an example of a derivation model of a propagation path response of feeder links using the pilot signals in FIG. 15.

FIG. 15 is an illustration showing an example of frequencies $f_1$, $f_2$, and $f_3$ of respective pilot signals when each of the GW stations 70(1) to 70(3) transmits a single pilot signal according to a comparative example. FIG. 16 is an illustration showing an example of a derivation model of a propagation path response of feeder links using the pilot signals in FIG. 15. In the illustrated example, pilot signals $S_{P1}$, $S_{P2}$, and $S_{P3}$ are transmitted one by one from respective GW station 70(1) to 70(3). The pilot signals $S_{P1}$, $S_{P2}$, and $S_{P3}$ are disposed in a first guard band GB1 which is a first adjacent band adjacent to the transmission signal band FB of the feeder link to which the desired signals S1, S2, and S3 are transmitted from the low frequency side.

For example, each of pilot signals $h_{11}$ and $h_{21}$ received by the FL antennas 211(1) and 211(2) of the HAPS 20 is represented by the following equations (4) and (5), and the ratio of these signals is represented by the following equation (6).

$$h_{11} = |h_{11}|e^{j\theta_{11}} = |h_{11}|e^{j2\pi f_1 \frac{d_1}{c}} \quad (4)$$

$$h_{21} = |h_{21}|e^{j\theta_{21}} = |h_{21}|e^{j2\pi f_1 \frac{d_1+\Delta d_{21}}{c}} \quad (5)$$

$$\frac{h_{21}}{h_{11}} = \frac{|h_{21}|}{|h_{11}|}e^{j(\theta_{21}-\theta_{11})} = \frac{|h_{21}|}{|h_{11}|}e^{j2\pi f_1 \frac{\Delta d_{21}}{c}} \quad (6)$$

In the foregoing equations (4) to (6), $d_1$ is the path length between the GW station 70(1) and the FL antenna 211(1), $\Delta d_{21}$ is the difference in path length (path difference) between the GW station 70(1) and each of the FL antennas 211(1) and 211(2), and $\Delta d_{31}$ is the difference in path length (path difference) between the GW station 70(1) and each of the FL antennas 211(1) and 211(3). The path length between the GW station 70(1) and the FL antenna 211(2) is represented by $d_1+\Delta d_{21}$, and the path length between the GW station 70(1) and the FL antenna 211(3) is represented by $d_1+\Delta d_{31}$.

From the foregoing equation (6), the path difference $\Delta d_{21}$ can be obtained by the following equation (7). $\theta$ in the equation is the phase difference between $h_{21}$ and $h_{11}$. Other path differences such as the route difference $\Delta d_{31}$ mentioned above can be obtained in the same manner.

$$e^{j2\pi f_1 \frac{\Delta d_{21}}{c}} = e^{j(\theta_{21}-\theta_{11})} \quad (7)$$

$$\Delta d_{21} = \frac{c}{2\pi f_1}\theta$$

$$= \frac{\lambda_1}{2\pi}\theta$$

$$(\theta = \theta_{21} - \theta_{11})$$

The same can be obtained for the above-mentioned path difference $\Delta d_{31}$ and other path differences $\Delta d_{12}$, $\Delta d_{13}$, $\Delta d_{23}$, and $\Delta d_{32}$.

Using the path differences $\Delta d_{21}$, $\Delta d_{31}$, $\Delta d_{12}$, $\Delta d_{13}$, $\Delta d_{23}$, and $\Delta d_{32}$ mentioned above, the propagation path response at the center frequency fsc of the transmission signal band of the feeder link can be estimated by the following equation (8).

$$H_P = \begin{bmatrix} |h_{11}| & |h_{12}|e^{j2\pi f_{sc}\frac{\Delta d_{12}}{c}} & |h_{13}|e^{j2\pi f_{sc}\frac{\Delta d_{13}}{c}} \\ |h_{21}|e^{j2\pi f_{sc}\frac{\Delta d_{21}}{c}} & |h_{22}| & |h_{23}|e^{j2\pi f_{sc}\frac{\Delta d_{23}}{c}} \\ |h_{31}|e^{j2\pi f_{sc}\frac{\Delta d_{31}}{c}} & |h_{32}|e^{j2\pi f_{sc}\frac{\Delta d_{32}}{c}} & |h_{33}| \end{bmatrix} \quad (8)$$

However, in case that each of the GW stations 70(1) to 70(3) transmits one pilot signal $S_{P1}$, $S_{P2}$, $S_{P3}$ in the first guard band GB1 as shown in FIG. 15 and FIG. 16, it is not possible to detect a path difference equal to or more than the wavelengths $\lambda_1$, $\lambda_2$, $\lambda_3$ of each pilot signal. For example, assuming that the frequency $f_1$ of the pilot signal $S_{P1}$ of the GW station 70(1) is 3.3 GHz, $\Delta d_{21}$ can be estimated only in the range of $0 < \Delta d_{21} < 0.09$ [m].

Therefore, in the present embodiment, plural pilot frequencies with frequencies different from each other are transmitted from each of the GW stations 70(1) to 70(3) so that the path difference equal to or more than the wavelengths $\lambda_1$, $\lambda_2$, $\lambda_3$ of each pilot signal $S_{P1}$, $S_{P2}$, $S_{P3}$ can be detected. In the example of the following embodiments, although it is illustrated regarding a case in which each of the GW stations 70(1) to 70(3) transmits two (plural) pilot signals with frequencies different from each other, the number of pilot signals transmitted by each of the GW stations 70(1) to 70(3) may be 3 or more. Further, the number of pilot signals may be different from each other between the GW stations 70(1) to 70(3).

Figure 17:
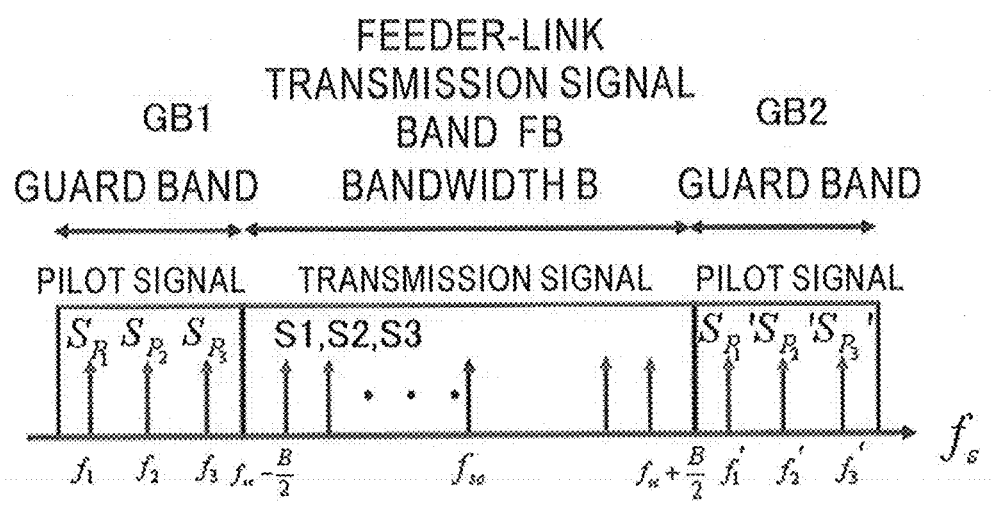
FIG. 17 is an illustration showing an example of frequency arrangement of respective pilot signals when plural GW stations respectively transmit plural pilot signals according to the embodiment.
Figure 18:
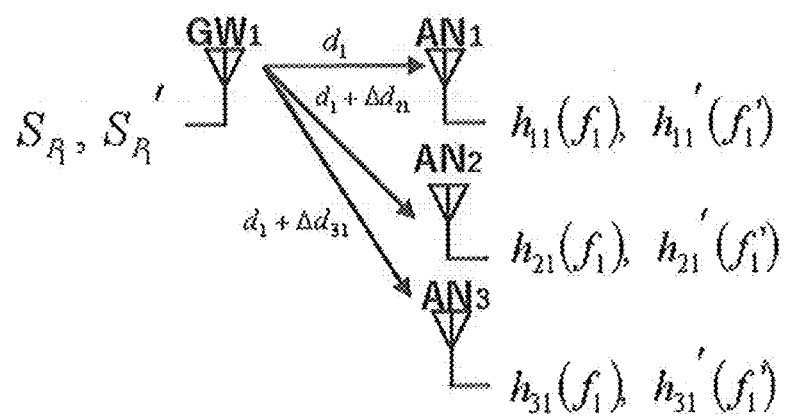
FIG. 18 is an illustration showing an example of a derivation model of a propagation path response of feeder links using the pilot signals in FIG. 17.

FIG. 17 is an illustration showing an example of frequency arrangement of respective pilot signals when the plural GW stations 70(1) to 70(3) according to the embodiment respectively transmits plural pilot signals. FIG. 18 is an illustration showing an example of a derivation model of the propagation path response of the feeder links using the pilot signals in FIG. 17. In the illustrated example, plural pilot signals transmitted from each of the GW station 70(1) to 70(3) are distributed and disposed in each of a first guard band GB1, which is a first adjacent band adjacent to the transmission signal band FB of the feeder link to which the desired signals S1, S2, S3 are transmitted from the GW stations 70(1) to 70(3) from the low frequency side and the high frequency side, and a second guard band GB2 which is a second adjacent band. Specifically, pilot signals $S_{P1}$, $S_{P2}$, $S_{P3}$, which are transmitted from respective GW station 70(1) to 70(3) with frequencies $f_1$, $f_2$, $f_3$ different from each other, are disposed in the first guard band GB1. Further, pilot signals $S_{P1}'$, $S_{P2}'$, $S_{P3}'$, which are transmitted from respective GW station 70(1) to 70(3) with frequencies $f_1'$, $f_2'$, $f_3'$ different from each other, are disposed in the second guard band GB2. The relay communication station 21 of the HAPS 20 separates each of the plural pilot signals $S_{P1}$, $S_{P2}$, $S_{P3}$ of the first guard band GB1 received from the GW stations 70(1), 70(2) and 70(3) by a filter, and separates each of the plural pilot signals $S_{P1}'$, $S_{P2}'$, $S_{P3}'$ of the second guard band GB2 received from the GW stations 70(1), 70(2) and 70(3) by a filter.

For example, each of the pilot signals $h_{11}$, $h_{11}'$, $h_{21}$ and $h_{21}'$ received by the FL antennas 211(1) and 211(2) of the HAPS 20 is represented by the following equations (9), (10), (11) and (12), and each of the ratios of these signals is represented by the following equations (13) and (14).

$$h_{11} = |h_{11}|e^{j\theta_{11}} = |h_{11}|e^{j2\pi f_1 \frac{d_1}{c}} \quad (9)$$

$$h_{11}' = |h_{11}|e^{j\theta_{11}'} = |h_{11}|e^{j2\pi f_1' \frac{d_1}{c}} \quad (10)$$

$$h_{21} = |h_{21}|e^{j\theta_{21}} = |h_{21}|e^{j2\pi f_1 \frac{d_1+\Delta d_{21}}{c}} \quad (11)$$

$$h_{21}' = |h_{21}|e^{j\theta_{21}'} = |h_{21}|e^{j2\pi f_1' \frac{d_1+\Delta d_{21}}{c}} \quad (12)$$

$$\frac{h_{21}}{h_{11}} = \frac{|h_{21}|}{|h_{11}|}e^{j(\theta_{21}-\theta_{11})} = \frac{|h_{21}|}{|h_{11}|}e^{j2\pi f_1 \frac{\Delta d_{21}}{c}} \quad (13)$$

$$\frac{h_{21}'}{h_{11}'} = \frac{|h_{21}|}{|h_{11}|}e^{j(\theta_{21}'-\theta_{11}')} = \frac{|h_{21}|}{|h_{11}|}e^{j2\pi f_1' \frac{\Delta d_{21}}{c}} \quad (14)$$

In the equations (9) to (14), $d_1$ is the path length between the GW station 70(1) and the FL antenna 211(1), and $\Delta d_{21}$ is the difference in path length (path difference) between the GW station 70(1) and each of the FL antennas 211(1) and 211(2). The path length between the GW station 70(1) and the FL antenna 211(2) is represented by $d_1+\Delta d_{21}$.

From the equations (13) and (14), the path difference $\Delta d_{21}$ can be obtained by the following equation (15). Note that $\theta$ in the equation (15) is a phase difference obtained by adding the phase difference between $h_{11}'$ and $h_{11}$ and the phase difference between $h_{21}$ and $h_{21}'$. That is, $\theta$=(phase difference between $h_{11}'$ and $h_{11}$)+(phase difference between $h_{21}$ and $h_{21}'$).

$$e^{j2\pi(f_1-f_1')\frac{\Delta d_{21}}{c}} = e^{j(\theta_{21}-\theta_{11}-\theta_{21}'+\theta_{11}')} \quad (15)$$

$$\Delta d_{21} = \frac{c}{2\pi(f_1-f_1')}\theta = \frac{c}{2\pi B}\theta$$

$$(\theta = \theta_{21} - \theta_{21}' + \theta_{11}' - \theta_{11})$$

Path difference $\Delta d_{31}$ and other path differences $\Delta d_{12}$, $\Delta d_{13}$, $\Delta d_{23}$, $\Delta d_{32}$ between the GW station 70(1) and each of the FL antennas 211(1) and 211(3) can be similarly obtained.

Using the path differences $\Delta d_{21}$, $\Delta d_{31}$, $\Delta d_{12}$, $\Delta d_{13}$, $\Delta d_{23}$, and $\Delta d_{32}$ mentioned above, the propagation path response at the center frequency fsc of the transmission signal band of the feeder link can be estimated as in the foregoing equation (8).

In case that each of the GW stations 70(1) to 70(3) transmits the plural pilot signals as shown in FIG. 17 and FIG. 18, it is possible to detect a path difference equal to or more than the wavelengths $\lambda_1$, $\lambda_2$, $\lambda_3$ of each pilot signal. For example, assuming the LTE, the bandwidth B of the transmission signal band FB of the feeder link is 18 MHz, so that $\Delta d_{21}$ can be estimated in the range within the wavelength of the pilot frequency difference B as shown in the equation (15). In the present example, it can be estimated accurately up to the range of $0<\Delta d_{21}<16$ [m], which is a range required for implementing.

Further, in the examples in FIG. 17 and FIG. 18, since the plural pilot signals $S_{P1}$, $S_{P2}$, $S_{P3}$ and pilot signals $S_{P1}'$, $S_{P2}'$, $S_{P3}'$, which are transmitted from respective GW station 70(1) to 70(3) with frequencies $f_1$, $f_2$, $f_3$, $f_1'$, $f_2'$, $f_3'$ different from each other, are evenly distributed and disposed in the first guard band GB1 and the second guard band GB2, each pilot signal can be separated by the filter and easily individually detected.

Figure 19:
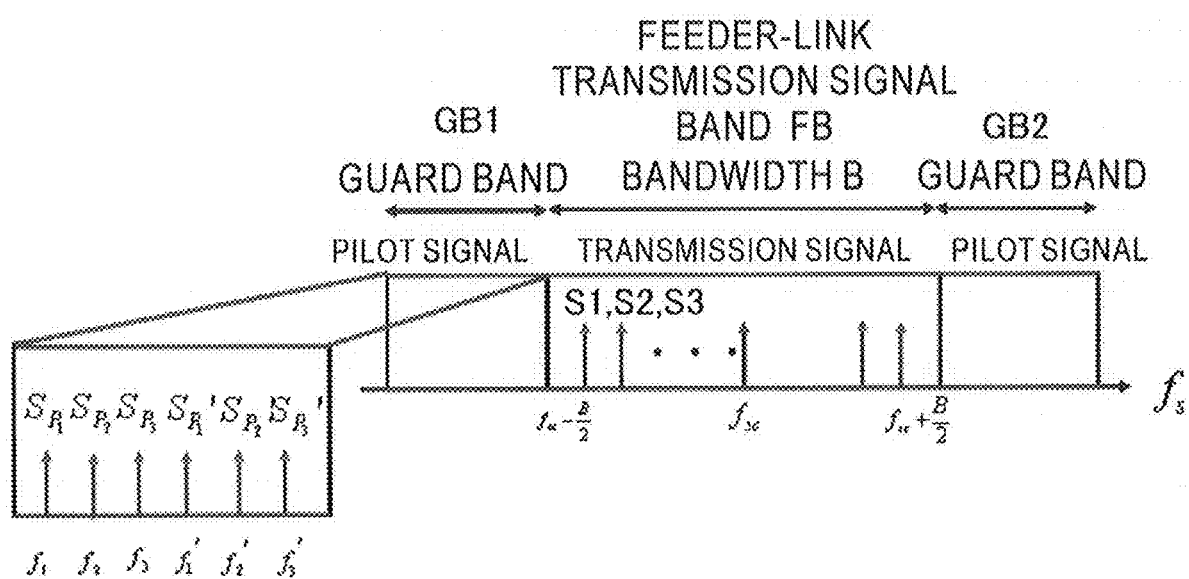
FIG. 19 is an illustration showing another example of arrangement of pilot frequencies when plural GW stations respectively transmit plural pilot signals according to the embodiment.

FIG. 19 is an illustration showing another example of arrangement of pilot signals when the plural GW stations 70(1) to 70(3) according to the embodiment respectively transmit plural pilot signals. In the illustrated example, it is an example in which the plurality of pilot signals $S_{P1}$, $S_{P2}$, $S_{P3}$ and pilot signals $S_{P1}'$, $S_{P2}'$, $S_{P3}'$ transmitted from the GW stations 70(1) to 70(3) with frequencies $f_1$, $f_2$, $f_3$, $f_1'$, $f_2'$, $f_3'$ different from each other are all disposed in the first guard band GB1. The relay communication station 21 of the HAPS 20 filters each of the plural pilot signals $S_{P1}$, $S_{P2}$, $S_{P3}$, $S_{P1}'$, $S_{P2}'$, and $S_{P3}'$ of the first guard band GB1 received from the GW stations 70(1) to 70(3) by the filter.

Figure 20:
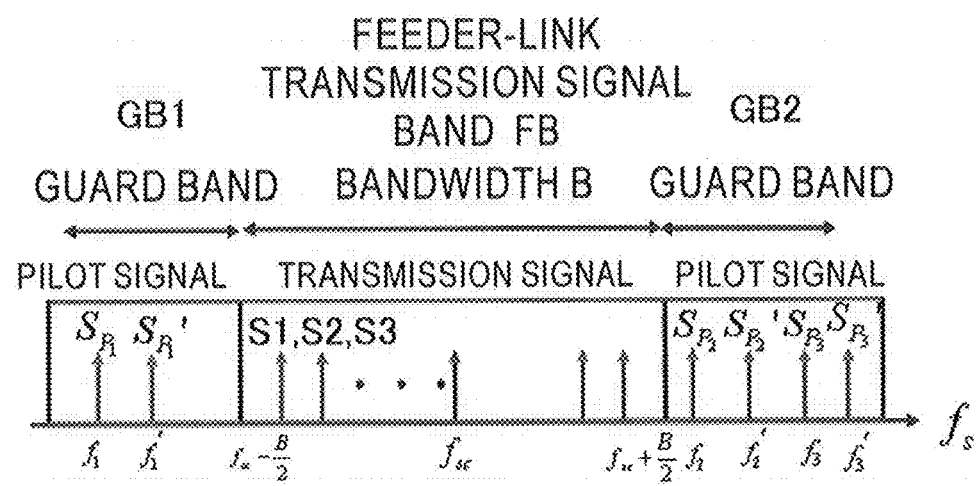
FIG. 20 is an illustration showing yet another example of arrangement of pilot frequencies when plural GW stations respectively transmit plural pilot signals according to the embodiment.

FIG. 20 is an illustration showing yet another example of arrangement of pilot signals when the plural GW stations 70(1) to 70(3) according to the embodiment respectively transmits plural pilot signals. The illustrated example is an example in which the numbers of pilot signals disposed in the first guard band GB1 and the second guard band GB2 are different from each other. Specifically, pilot signals $S_{P1}$ and $S_{P1}'$, which are transmitted from the GW station 70(1) with frequencies $f_1$ and $f_1'$ different from each other, are disposed in the first guard band GB1, and pilot signals $S_{P2}$, $S_{P2}'$, $S_{P3}$, $S_{P3}'$, which are transmitted from GW stations 70(2) and 70(3) with frequencies $f_2$, $f_2'$, $f_3$, $f_3'$ different from each other, are disposed in the second guard band GB2. The relay communication station 21 of the HAPS 20 separates each of the plural pilot signals $S_{P1}$ and $S_{P1}'$ of the first guard band GB1 received from the GW station 70(1) by the filter, and separates each of the plural pilot signals $S_{P2}$, $S_{P2}'$, $S_{P3}$, $S_{P3}'$ of the second guard band GB2 received from the GW stations 70(2) and 70(3) by the filter.

In particular, in an arrangement example of the pilot signal in FIG. 20, the pilot signals $S_{P1}$ and $S_{P1}'$ transmitted from respective GW station 70($i$) ($i$=1, 2, 3) are disposed in the same guard band. Specifically, the pilot signals $S_{P1}$, $S_{P1}'$ transmitted from the GW station 70(1) are disposed in the first guard band GB1, and the pilot signals $S_{P2}$, $S_{P2}'$, $S_{P2}$, $S_{P3}$, $S_{P3}'$ transmitted from the GW stations 70(2) and 70(3) are disposed in the second guard band GB2. When the pilot signals $S_{P1}$, $S_{P1}'$ transmitted from the same GW station 70($i$) at frequencies $f_1$ and $f_1'$ are disposed in the same guard band in this way, the frequency difference of $f_1$-$f_1'$ becomes small, so that the estimated distance of $\Delta d_{21}$ becomes large as shown in the foregoing equation (15).

It is noted that, the weight used for the interference canceller using the matrix $H_{fc}$ of the propagation path response can be calculated by, for example, the ZF (Zero-Forcing) method or the MMSE (Minimum Mean Square Error) method using the matrix of the propagation path response.

For example, in the ZF method, the weight W can be obtained by the inverse matrix of the matrix $H_{fc}$ of the propagation path response as in the following equation (16).

$$W = H_{fc}^{-1} \qquad (16)$$

Further, in the MMSE method, the weight W can be used by the following equation (17). Herein, $N_T$ is the number of transmission antennas and $\gamma$ is the SNR.

$$W = \left( H_{fc}^H H_{fc} + \frac{N_T I_{N_T}}{\gamma} \right)^{-1} H_{fc}^H \qquad (17)$$

Figure 21:
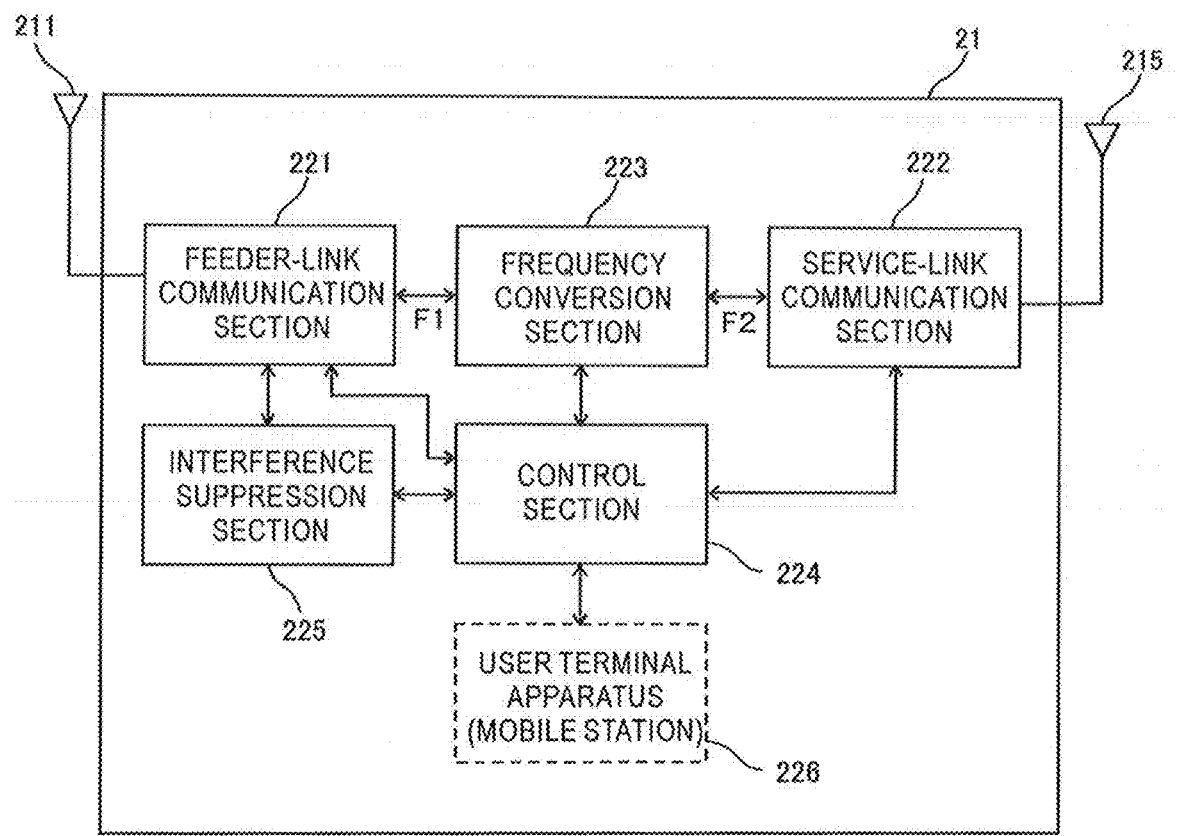
FIG. 21 is an illustration showing an example of a main configuration of a relay communication station of HAPS according to the embodiment.

FIG. 21 is an illustration showing an example of a main configuration of the relay communication station 21 of the HAPS 20 according to the embodiment. In FIG. 20, the relay communication station 21 is provided with a feeder-link communication section 221, a service-link communication section 222, a frequency conversion section 223, a control section 224 that controls each section, and an interference suppression section 225.

The feeder-link communication section 221 transmits and receives radio signals of a first frequency F1 for feeder link to and from the GW station 70 via the FL antenna 211. Further, the feeder-link communication section 221 receives plural pilot signals transmitted from each of the plural GW stations 70(1) to 70(3), and separates each of the received plural pilot signals by the filter. The service-link communication section 222 transmits and receives radio signals of a second frequency F2 for the service link to and from the terminal apparatus 61 via the service link antenna 115. The frequency conversion section 223 performs a frequency conversion between the first frequency F1 and the second frequency F2 between the feeder-link communication section 221 and the service-link communication section 222. The radio signals relayed by the relay communication station 21 may be transmitted and received, for example, by using the OFMDA communication method conforming to the LTE or LTE-Advanced standard. In this case, good communication quality can be maintained even if multipaths with different radio signal delays occur.

The control section 224 can control each section by executing a program incorporated in advance.

The interference suppression section 225 performs a process of suppressing interference between plural feeder links formed between the HAPS and the plural GW stations 70(1) to 70(3) as illustrated in the following (1) to (3) by executing a program incorporated in advance.

(1) Based on the reception results of plural pilot signals received from each of the plural GW stations 70(1) to 70(3), the plural path differences $\Delta d_{21}$, $\Delta d_{31}$, $\Delta d_{12}$, $\Delta d_{13}$, $\Delta d_{23}$, $\Delta d_{32}$ between each of the plural GW stations 70 and the FL antenna 211 are calculated to estimate the propagation path response at the center frequency fsc of the transmission signal band of the feeder link.

(2) Based on the foregoing plural propagation path responses, for each of the plural GW stations 70(1) to 70(3), the weight W for suppressing the interference signal is calculated, wherein the interference signal causes an interference by the transmission signal transmitted from the GW station and received with the directional beams corresponding to the other gateway stations.

(3) For each of the plural GW stations 70(1) to 70(3), from the reception signal received by the directional beam corresponding to the GW station, the reception signal received by the directional beam corresponding to the other GW station is multiplied by the weight W corresponding to the other GW station and subtracted.

It is noted that, in case of receiving control information from the remote control apparatus (control source) of the communication operator of the mobile communication network or transmitting information to the remote control apparatus, a user terminal (mobile station) 226 connected to the control section 224 may be provided. The control section 224, for example, may receive control information transmitted from the remote control apparatus by the user terminal (mobile station) 226, and control each section based on the control information. Herein, the communication between the remote control apparatus and the user terminal (mobile station) 226 may be performed using, for example, the IP address (or telephone number) assigned to each of the remote control apparatus and the user terminal (mobile station) 226.

As described above, according to the present embodiment, it is possible to dynamically suppress the interferences in the multiple feeder links of the same frequency between the HAPS 20 and the plural GW stations 70(1) to 70(3).

In particular, according to the present embodiment, by transmitting plural pilot signals $S_{P1}$, $S_{P2}$, $S_{P3}$, $S_{P1}'$, $S_{P2}'$, $S_{P3}'$ with frequencies different from each other from each of the plural GW stations 70(1) to 70(3), the path difference between the HAPS 20 and the plural GW stations 70(1) to 70(3) required for the dynamic suppression of interferences in the multiple feeder links can be estimated and grasped up to the range required for implementing, so that the interferences in the multiple feeder links can be suppressed accurately.

Further, according to the present embodiment, it is possible to improve the frequency utilization efficiency of the feeder links while suppressing the decrease in the SINR of the feeder links of the HAPS 20.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61 terminal apparatus
70, 70(1) to 70(3) gate way station (GW station)
71, 71(1) to 71(3) antenna for feeder link (GW antenna)
200C, 200C(1) to 200C(7) three dimensional cell
200F, 200F(1) to 200F(7) foot print
211, 211(1) to 211(3) antenna for feeder link (FL antenna)
212, 212(1) to 212(3) antenna directional beam
215 antenna for service link (SL antenna)

The invention claimed is:

1. A system comprising an aerial-staying type communication relay apparatus including a relay communication station that relays a radio communication of a terminal apparatus, the system comprising plural gateway stations that are time-synchronized with each other, the gateway stations transmitting and receiving relay signals different from each other on a same frequency in feeder links between the relay communication station of the aerial-staying type communication relay apparatus and the plural gateway stations,
wherein the relay communication station comprises:
a feeder-link communication section that transmits and receives relay signals different from each other on the same frequency in the feeder links to and from the plural gateway stations; and
an interference suppression section that suppresses interferences between plural feeder links formed between the plural gateway stations and the interference suppression section,
wherein each of the plural gateway stations transmits plural pilot signals with frequencies different from each other,
wherein the feeder-link communication section receives the plural pilot signals with frequencies different from each other, the plural pilot signals being transmitted respectively from the plural gateway stations, and
wherein the interference suppression section:
estimates a propagation path response by calculating plural path differences between each of the plural gateway stations and an antenna for feeder link of the communication relay apparatus based on reception results of the plural pilot signals received respectively from the plural gateway stations;
calculates, for each of the plural gateway stations, a weight for suppressing an interference signal that causes an interference by a transmission signal transmitted from the gateway station and received with directional beams corresponding to other gateway stations, based on the plural propagation path responses; and
subtracts, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations, and
wherein two guard bands are located on both sides of a transmission signal band of the feeder link, and for each of the plural gateway stations, all of the plural pilot signals transmitted from a same gateway station are distributed in a same guard band that is either one of the two guard bands.

2. The system according to claim 1,
wherein all of the plural pilot signals transmitted from all of the plural gateway stations are distributed in the same guard band.

3. The system according to claim 1,
wherein the interference suppression section calculates the plural weights by estimating the plural propagation path responses at a center frequency of a transmission signal band of the feeder link or a frequency around the center frequency.

4. The system according to claim 1,
wherein each of the plural weights is calculated by a ZF (Zero-Forcing) method or an MMSE (Minimum Mean Square Error) method using a matrix of the propagation path response.

5. The system according to claim 1,
wherein each of the plural gateway stations comprises an antenna control section that controls an antenna for feeder link so as to track the aerial-staying type communication relay apparatus.

6. The system according to claim 1,
wherein the aerial-staying type communication relay apparatus comprises:
an antenna for feeder link having plural directional beams respectively corresponding to the plural gateway stations; and
an antenna control section that controls the antenna for feeder link so that each of the plural beams directs toward a corresponding gateway station.

7. The system according to claim 6,
wherein the antenna for feeder link is a plurality of antennas for feeder link having directional beams in directions different from each other, and
wherein the antenna control section mechanically controls each of the plurality of antennas for feeder link so that each of the directional beams of the plurality of antennas for feeder link is directed toward a corresponding gateway station.

8. The system according to claim 6,
wherein the antenna for feeder link is an array antenna capable of forming the plural directional beams respectively in arbitrary outward directions centered on a virtual axis in a vertical direction, and
wherein the antenna control section controls amplitudes and phases of transmission/reception signals for the plural antenna elements of the array antenna so that each of the plural directional beams is directed toward a corresponding gateway station.

9. The system according to claim 6,
wherein the antenna for feeder link is a plurality of array antennas capable of forming directional beams respectively in predetermined angle ranges centered on directions different from each other, and
wherein the antenna control section selectively performs a control of amplitudes and phases of transmission/reception signals for plural antenna elements of each of the plurality of array antennas and a switching control of the plurality of array antennas, so that each of the directional beams of the plurality of array antennas is directed toward a corresponding gateway station.

10. A relay communication station incorporated in an aerial-staying type communication relay apparatus to relay a radio communication of a terminal apparatus, the relay communication station comprising:
a feeder-link communication section that transmits and receives relay signals different from each other on a same frequency in feeder links between the feeder-link communication section and plural gateway stations that are time-synchronized with each other; and
an interference suppression section that suppresses interferences between plural feeder links formed between the plural gateway stations and the interference suppression section, and
wherein the feeder-link communication section receives plural pilot signals with frequencies different from each other, the plural pilot signals being transmitted respectively from the plural gateway stations, and
wherein the interference suppression section:
estimates a propagation path response by calculating plural path differences between each of the plural gateway stations and an antenna for feeder link of the communication relay apparatus based on reception results of the plural pilot signals received respectively from the plural gateway stations,
calculates, for each of the plural gateway stations, a weight for suppressing an interference signal that causes an interference by a transmission signal transmitted from the gateway station and received with directional beams corresponding to other gateway stations, based on the plural propagation path responses, and
subtracts, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations, and
wherein two guard bands are located on both sides of a transmission signal band of the feeder link, and for each of the plural gateway stations, all of the plural pilot signals transmitted from a same gateway station are distributed in a same guard band that is either one of the two guard bands.

11. An aerial-staying type communication relay apparatus comprising the relay communication station according to claim 10.

12. The relay communication station according to claim 10, wherein all of the plural pilot signals transmitted from all of the plural gateway stations are distributed in the same guard band.

13. A gateway station for transmitting and receiving relay signals different from each other on a same frequency in a feeder link between the gateway station and a relay communication station, the relay communication station being incorporated in an aerial-staying type communication relay apparatus to relay a radio communication of a terminal apparatus, the gateway station comprising:
a memory containing program code; and
a processor, coupled to the memory, that executes the program code to perform the following:
time synchronizing with another gateway station that transmits and receives relay signals on the same frequency in the feeder link between the relay communication station and the gateway station, and
transmitting plural pilot signals with frequencies different from each other in the feeder link, wherein two guard bands are located on both sides of a transmission signal band of the feeder link, and all of the plural pilot signals transmitted from the gateway station are distributed in a same guard band that is either one of the two guard bands.

14. A feeder-link interference suppression method in a relay communication station that is incorporated in an aerial-staying type communication relay apparatus and relays a radio communication of a terminal apparatus, the feeder-link interference suppression method comprising:
receiving plural pilot signals with frequencies different from each other, the plural pilot signals being transmitted respectively from plural gateway stations that are time-synchronized with each other;
estimating a propagation path response by calculating plural path differences between each of the plural gateway stations and an antenna for feeder link of the communication relay apparatus based on reception results of the plural pilot signals received respectively from the plural gateway stations;

calculating, for each of the plural gateway stations, a weight for suppressing an interference signal that causes an interference by a transmission signal transmitted from the gateway station and received with directional beams corresponding to other gateway stations, based on the plural propagation path responses; and subtracting, for each of the plural gateway stations, reception signals received respectively with the directional beams corresponding to the other gateway stations and multiplied respectively by the weight corresponding to the other gateway stations, from the reception signal received by the directional beam corresponding to each of the gateway stations, and wherein two guard bands are located on both sides of a transmission signal band of the feeder link, and for each of the plural gateway stations, all of the plural pilot signals transmitted from a same gateway station are distributed in a same guard band that is either one of the two guard bands.

15. The feeder-link interference suppression method according to claim 14, wherein all of the plural pilot signals transmitted from all of the plural gateway stations are distributed in the same guard band.

16. A feeder-link communication method in a gateway station for transmitting and receiving relay signals different from each other on a same frequency in a feeder link between the gateway station and a relay communication station, the relay communication station being incorporated in an aerial-staying type communication relay apparatus to relay a radio communication of a terminal apparatus, the feeder-link communication method comprising:

time-synchronizing with another gateway station that transmits and receives relay signals on the same frequency in the feeder link between the relay communication station and the gateway station; and transmitting plural pilot signals with frequencies different from each other in the feeder link, and wherein two guard bands are located on both sides of a transmission signal band of the feeder link, and all of the plural pilot signals transmitted from the gateway station are distributed in a same guard band that is either one of the two guard bands.

17. A non-transitory computer readable medium containing software executed by a computer or a processor installed in a relay communication station that is incorporated in an aerial-staying type communication relay apparatus and relays a radio communication of a terminal apparatus, the software executed by the computer or the processor to perform the following:

transmitting and receiving relay signals different from each other on a same frequency in a feeder link between the relay communication station and plural gateway stations that are time-synchronized with each other;

receiving plural pilot signals with frequencies different from each other, the plural pilot signals being transmitted respectively from the plural gateway stations; a program code for separating each of the received plural pilot signals with a filter;

estimating a propagation path response by calculating plural path differences between each of the plural gateway stations and an antenna for feeder link of the communication relay apparatus based on reception results of the plural pilot signals received respectively from the plural gateway stations;

calculating, for each of the plural gateway stations, a weight for suppressing an interference signal that causes an interference by a transmission signal transmitted from the gateway station and received with directional beams corresponding to other gateway stations, based on the plural propagation path responses; and subtracting, for each of the plural gateway stations, reception signals received respectively by the directional beams corresponding to the other gateway stations and multiplied respectively by the weight corresponding to the other gateway stations, from the reception signal received by the directional beam corresponding to each of the gateway stations, wherein two guard bands are located on both sides of a transmission signal band of the feeder link, and for each of the plural gateway stations, all of the plural pilot signals transmitted from a same gateway station are distributed in a same guard band that is either one of the two guard bands.

18. The non-transitory computer readable medium according to claim 17, wherein all of the plural pilot signals transmitted from all of the plural gateway stations are distributed in the same guard band.

19. A non-transitory computer readable medium containing software executed by a computer or a processor installed in a gateway station for transmitting and receiving relay signals different from each other on a same frequency in a feeder link between the gateway station and a relay communication station, the relay communication station being incorporated in an aerial-staying type communication relay apparatus to relay a radio communication of a terminal apparatus, the software executed by the computer or the processor to perform the following time synchronizing with another gateway station that transmits and receives relay signals on the same frequency in the feeder link between the relay communication station and the gateway station, and transmitting plural pilot signals with frequencies different from each other in the feeder link, wherein two guard bands are located on both sides of a transmission signal band of the feeder link, and all of the plural pilot signals transmitted from the gateway station are distributed in a same guard band that is either one of the two guard bands.

* * * * *